United States Patent
Gleeson et al.

(10) Patent No.: US 11,348,103 B2
(45) Date of Patent: May 31, 2022

(54) EMV-SESSION DATA NETWORK AND METHOD OF PROCESSING EMV-SESSION DATA

(71) Applicant: The Toronto-Dominion Bank, Toronto (CA)

(72) Inventors: Bryan Michael Gleeson, Bowmanville (CA); Igor Elkhinovich, Toronto (CA); Jeffrey Aaron Ecker, North York (CA); Adam Douglas McPhee, Waterloo (CA); Matta Wakim, Petersburg (CA); Kyryll Odobetskiy, Waterloo (CA); Dmitri Rabinovich, Richmond Hill (CA); John Jong-Suk Lee, Toronto (CA); Arun Victor Jagga, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 375 days.

(21) Appl. No.: 16/009,926

(22) Filed: Jun. 15, 2018

(65) Prior Publication Data

US 2019/0385161 A1    Dec. 19, 2019

(51) Int. Cl.
*G06Q 20/38* (2012.01)
*G06Q 20/20* (2012.01)
(Continued)

(52) U.S. Cl.
CPC ..... *G06Q 20/38215* (2013.01); *G06Q 20/204* (2013.01); *G06Q 20/401* (2013.01); *G06Q 30/0238* (2013.01); *G06Q 2220/00* (2013.01)

(58) Field of Classification Search
CPC ............. G06Q 20/387; G06Q 30/0255; G06Q 20/409; G06Q 30/0234
See application file for complete search history.

(56) References Cited

U.S. PATENT DOCUMENTS

| 2004/0050922 A1* | 3/2004 | Gauthier | G06Q 20/20 235/375 |
| 2007/0022008 A1* | 1/2007 | Kingsborough | G06Q 20/10 705/14.17 |

(Continued)

FOREIGN PATENT DOCUMENTS

EP    3136326 A1    3/2017

OTHER PUBLICATIONS

M. McConnachie, "Prepayment Advances with Smart-card Solutions That Cover Electricity, Gas and Water", Metering and Tariffs for Energy Supply, Conference Publication No. 462, May 1999, pp. 248-250.

(Continued)

*Primary Examiner* — Johann Y Choo
(74) *Attorney, Agent, or Firm* — Graham Patent Law

(57) ABSTRACT

An EMV-session data network includes a POS terminal and at least one computer server. The POS terminal is configured to receive ledger data and a cryptogram from a communications appliance, extract an account identifier from the ledger data, and transmit to the server an authorization request message that includes the account identifier, the authorization value and the cryptogram. The server is configured to transmit to the POS terminal an authorization response message that confirms that the cryptogram was generated by the communications appliance from the account identifier and the authorization value. The POS terminal is further configured to extract a token from the ledger data and to transmit to the server a loyalty rewards request message that includes the token. The server is further configured to initiate a points reward to an account that is associated with the token.

20 Claims, 7 Drawing Sheets

(51) Int. Cl.
  *G06Q 30/02* (2012.01)
  *G06Q 20/40* (2012.01)

(56) References Cited

U.S. PATENT DOCUMENTS

| | | | | |
|---|---|---|---|---|
| 2013/0054390 | A1* | 2/2013 | Kerchner | G07G 1/0081 705/17 |
| 2013/0151325 | A1* | 6/2013 | Poidomani | G06Q 30/0226 705/14.27 |
| 2013/0290087 | A1 | 10/2013 | Merwarth et al. | |
| 2014/0040128 | A1* | 2/2014 | Park | G06Q 20/227 705/42 |
| 2014/0074605 | A1* | 3/2014 | Sanchez | G06Q 30/0267 705/14.53 |
| 2014/0180810 | A1* | 6/2014 | Boal | G06Q 30/0269 705/14.53 |
| 2015/0213478 | A1* | 7/2015 | Guiney | G06Q 30/0231 705/14.31 |
| 2015/0373762 | A1* | 12/2015 | Raj | H04W 76/14 370/329 |
| 2016/0071094 | A1 | 3/2016 | Krishnaiiah et al. | |
| 2016/0078428 | A1 | 3/2016 | Moser et al. | |
| 2016/0267517 | A1* | 9/2016 | Zachrisen | G06Q 30/0233 |
| 2017/0286987 | A1* | 10/2017 | Carter | G06Q 30/0229 |

OTHER PUBLICATIONS

H. Rodriques, et al., "MobiPag: Integrated Mobile Payment, Ticketing and Couponing Solution Based on NFC", Sensors 2014, I4, Jul. 2014, pp. 13389-13415.

"Session", TechTarget, http://whatis.techtarget.com/definition/session.

"Session (computer science)", Wikipedia, http://en.wikipedia.org/wiki/Session_(computer_science).

"ISO 8583", Wikipedia, http://en.wikipedia.org/wiki/ISO_8583.

"EMV Integrated Circuit Card Specifications for Payment Systems, Book 3, Application Specification, Version 4.1", EMVCo, LLC, May 2004, pp. 83-84, 63-64.

* cited by examiner

US 11,348,103 B2

EMV-SESSION DATA NETWORK AND METHOD OF PROCESSING EMV-SESSION DATA

FIELD

This patent application relates to a network and method of processing payment data. In particular, this patent application describes a network and method for processing EMV-compliant payment session data.

BACKGROUND

A point-of-sale (POS) terminal may include an EMV-compliant pin-pad device and a loyalty card reader. To effect an electronic payment for a transaction, a consumer might interface a loyalty card with the loyalty card reader, and might interface an EMV-compliant payment card (e.g. credit card or debit card) with the pin-pad device. The loyalty card reader may read a loyalty card number from the loyalty card, and the pin-pad device may read a payment card number from the payment card.

The POS terminal may then transmit the payment card number and a transaction amount to the payment card issuer. After the payment card issuer authorizes the transaction amount from a payment account that is associated with the payment card number, the POS terminal may transmit the loyalty card number to the loyalty card issuer. The loyalty card issuer may calculate a loyalty points reward for the transaction, and use the loyalty points reward to update a points balance in a rewards ledger that is associated with the loyalty card number.

SUMMARY

This patent application discloses a data processing network, a point-of-sale (POS) terminal, and associated method in which the POS terminal receives ledger data, from a communications appliance, as part of an EMV-compliant communication with the communications appliance, extracts a primary ledger identifier and a loyalty token from the ledger data, and uses the primary ledger identifier and loyalty token respectively to request authorization and loyalty rewards for the transaction.

In accordance with a first aspect of this disclosure, there is provided an EMV-session data network that includes a POS terminal and at least one computer server.

The POS terminal is configured to establish an EMV-compliant communications session with a communications appliance, and receive ledger data and a cryptogram from the communications appliance via the communications session.

The POS terminal is configured to extract a primary ledger identifier from the ledger data, and to transmit an authorization request message to at least one computer server. The authorization request message includes the primary ledger identifier, the cryptogram and an authorization value.

The at least one computer server is configured to receive the authorization request message, and to generate an authorization response message confirming that the communications appliance generated the cryptogram from the primary ledger identifier and the authorization value. The at least one computer server is also configured to transmit the authorization response message to the POS terminal.

The POS terminal is further configured to receive the authorization response message, extract a loyalty token from the ledger data, and transmit to the at least one computer server a loyalty rewards request message that includes the loyalty token.

The at least one computer server is configured to receive the loyalty rewards request message and to initiate a loyalty points reward to a secondary ledger associated with the loyalty token.

In accordance with a second aspect of this disclosure, there is provided a method of processing EMV-session data.

The method, in accordance with this second aspect, involves a POS terminal establishing an EMV-compliant communications session with a communications appliance, and receiving ledger data and a cryptogram from the communications appliance via the communications session.

The POS terminal extracts a primary ledger identifier from the ledger data, and transmits to at least one computer server an authorization request message that includes the primary ledger identifier, the cryptogram and an authorization value.

The POS terminal receives from the at least one computer server an authorization response message in response to the authorization request message. The authorization response message confirms that the communications appliance generated the cryptogram from the primary ledger identifier and the authorization value.

The POS terminal extracts a loyalty token from the ledger data, and transmits to the at least one computer server a loyalty rewards request message that includes the loyalty token.

The POS terminal receives from the at least one computer server a rewards response message in response to the loyalty rewards request message. The rewards response message advises of a loyalty points reward to a secondary ledger associated with the loyalty token.

In accordance with a third aspect of this disclosure, there is provided a pin-pad device that includes a data input device, a communications interface, and a data processor.

The data processor is in communication with the data input device and the communications interface, and is configured to establish an EMV-compliant communications session with a communications appliance, and receive ledger data and a cryptogram from the communications appliance via the communications session and the communications interface.

The data processor is configured to extract a primary ledger identifier from the ledger data, and to transmit to at least one computer server an authorization request message that includes the primary ledger identifier, the cryptogram and an authorization value.

The data processor is configured to receive from the at least one computer server an authorization response message in response to the authorization request message. The authorization response message confirms that the communications appliance generated the cryptogram from the primary ledger identifier and the authorization value.

The data processor is configured to extract a loyalty token from the ledger data, and to transmit to the at least one computer server a loyalty rewards request message that includes the loyalty token.

The data processor is configured to receive from the at least one computer server a rewards response message in response to the loyalty rewards request message. The rewards response message advises of a loyalty points reward to a secondary ledger associated with the loyalty token.

In one implementation, the POS terminal transmits to the communications appliance, via the EMV-compliant communications session, a read command requesting a ledger identifier from the communications appliance, and receives the ledger data from the communications appliance, via the EMV-compliant communications session, in response to the read command.

The communications appliance may store a cryptographic key that is uniquely associated with the communications appliance. The POS terminal may transmit to the communications appliance, via the EMV-compliant communications session, a generate cryptogram command that includes the authorization value, and receive the cryptogram from the communications appliance, via the EMV-compliant communications session, in response to the generate cryptogram command. The at least one computer server may confirm that the cryptogram was generated from the primary ledger identifier, the authorization value and the cryptographic key.

In one implementation, the communications appliance generates a cypher from the primary ledger identifier and the loyalty token. The POS terminal receives the cypher from the communications appliance in response to the read command, and recovers the primary ledger identifier and the loyalty token from the cypher.

The at least one computer server may generate from the loyalty token an offer identifier that excludes particulars of the secondary ledger. The at least one computer server may initiate the loyalty points reward to the secondary ledger by transmitting the offer identifier to a loyalty program server. The loyalty program server may generate a rewards value from the offer identifier and apply the rewards value to the secondary ledger.

Before the at least one computer server generates the offer identifier, the at least one computer server may receive the offer identifier from the loyalty program server, generate the loyalty token, store the loyalty token in an offer database in association with the offer identifier, and transmit the loyalty token to the communications appliance.

In accordance with a fourth aspect of this disclosure, there is provided a computer server that includes a memory, a network interface; and a data processor. The memory includes an offer database. The data processor is in communication with the memory and the network interface, and is configured to receive an offer identifier from a loyalty program server via the network interface, save the offer identifier in the offer database in association with a loyalty token, and transmit the loyalty token to a communications appliance.

The data processor is configured to receive a loyalty rewards request message from a point-of-sale terminal via the network interface. The loyalty rewards request message includes the loyalty token. The data processor is also configured to initiate a loyalty points reward to a secondary ledger that is associated with the loyalty token. The data processor initiates the loyalty points reward by generating the loyalty token from the loyalty token, and transmitting the offer identifier to the loyalty program server. The offer identifier excludes particulars of the secondary ledger.

In accordance with a fifth aspect of this disclosure, there is provided a method of processing loyalty tokens. The method, in accordance with this fifth aspect, involves at least one computer server receiving an offer identifier from a loyalty program server, saving the offer identifier in an offer database in association with a loyalty token, and transmitting the loyalty token to a communications appliance.

The method also involves the at least one computer server receiving from a point-of-sale terminal a loyalty rewards request message that includes the loyalty token, and initiating a loyalty points reward to a secondary ledger that is associated with the loyalty token. The at least one computer server initiates the loyalty points reward by generating the loyalty token from the loyalty token, and transmitting the offer identifier to the loyalty program server. The offer identifier excludes particulars of the secondary ledger.

Since, in accordance with the foregoing aspects of the disclosure, the POS terminal receives both the primary ledger identifier and the loyalty token within a single EMV-compliant data communication session with the communications appliance, the security of the communication of these data elements to the POS terminal is improved in comparison to conventional terminal-appliance data communication sessions, without departing from the requirements of the EMV specification.

Further, since the POS terminal need not set up and tear down separate communications sessions with a payment card and a loyalty card in order to request authorization and loyalty rewards for the transaction, the processing load on the POS terminal is reduced in comparison to conventional POS terminals. The POS terminal thereby constitutes an improved EMV-compliant payment device.

BRIEF DESCRIPTION OF THE DRAWINGS

An exemplary EMV-session data network, point-of-sale (POS) terminal and method of processing EMV-session data will now be described, with reference to the accompanying drawings, in which.

DETAILED DESCRIPTION

Payment Data Processing Network—Overview

Figure 1:
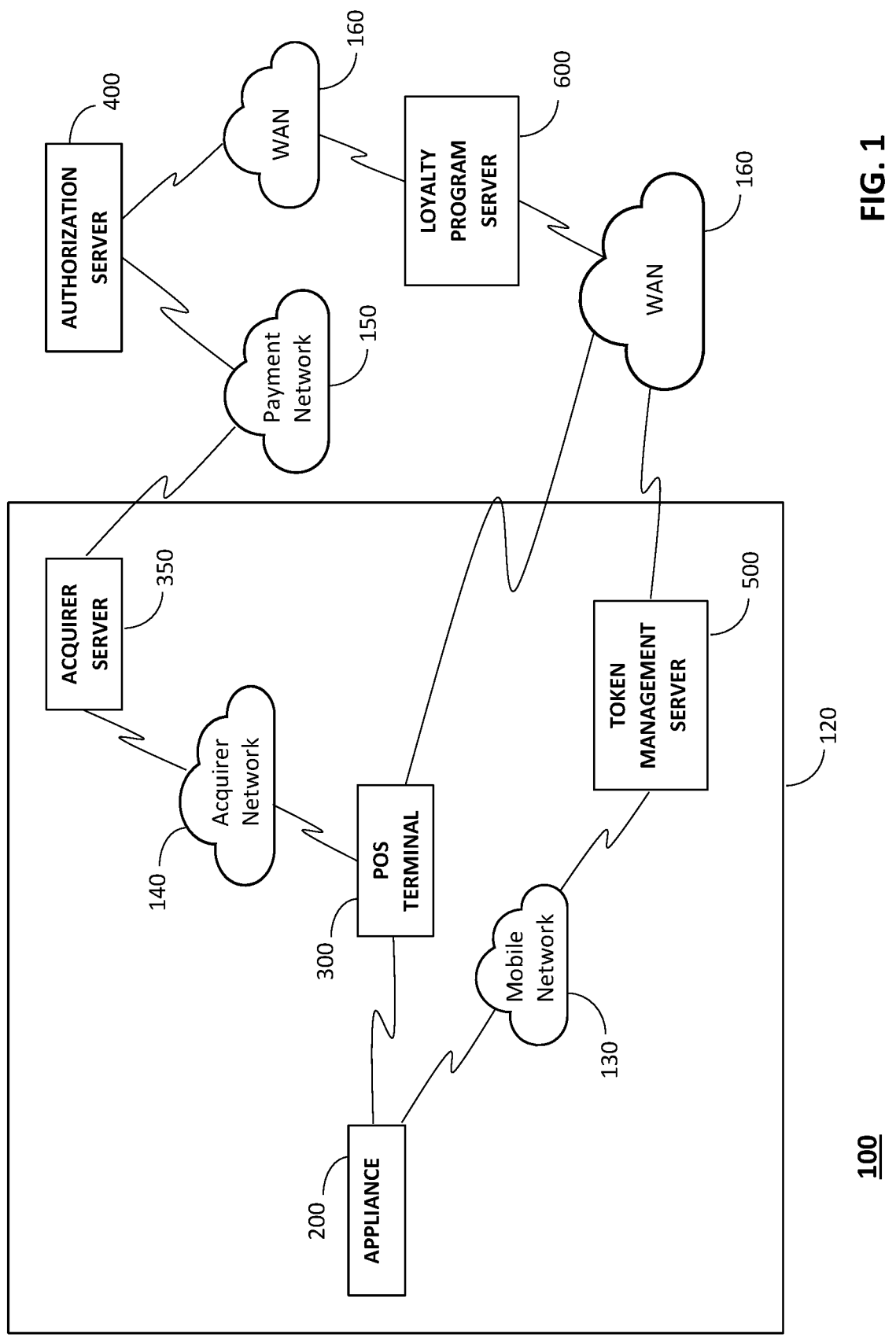
FIG. 1 is a schematic view of a payment data processing network, that includes an EMV-session data network, an authorization server and a loyalty program server.

FIG. 1 is a schematic view of a payment data processing network, denoted generally as 100. As shown, the payment data processing network 100 includes an EMV-session data network 120, and an authorization server 400 and a loyalty program server 600, and is configured to effect completion of a financial transaction between a consumer and a merchant.

As shown, the EMV-session data network 120 includes a communications appliance 200, a POS terminal 300, an acquirer server 350 and a token management server 500, and is configured to process EMV-session data received from the communications appliance 200.

The communications appliance 200 is configured to communicate with the POS terminal 300. The communications appliance 200 may also be configured to communicate with the token management server 500 via a mobile cellular communications network 130, such as a LTE, WiMax, UMTS, CDMA or GSM network, as examples.

The POS terminal 300 is typically deployed at a merchant's business premises, and is configured to communicate with the authorization server 400 via the acquirer server 350. The POS terminal 300 is also configured to communicate with the communications appliance 200, and to communicate with the token management server 500 via a wide area network 160, such as the Internet.

The acquirer server 350 is associated with the merchant's financial institution, and is configured to communicate with the POS terminal 300 via a secure communications (acquirer) network 140. The acquirer server 350 is also configured to communicate with the authorization server 400 via a secure communications (payment) network 150, such as VisaNet or the Mastercard Network.

The authorization server 400 may be associated with the consumer's financial institution, and is configured to communicate with the acquirer server 350 via the payment network 150. Optionally, the authorization server 400 may also be configured to communicate with the loyalty program server 600 via a wide area network 160, such as the Internet. The authorization server 400 may also communicate with or include a primary ledger database that stores a plurality of primary ledger identifiers each in association with a respective primary ledger.

The financial institution associated with the authorization server 400 may assign (or may authorize a third party to assign) respective primary ledger identifiers to customers of the financial institution. The financial institution may also issue EMV command processors (discussed below) to its customers to allow the customers to initiate payment transactions. Accordingly, the financial institution associated with the authorization server 400 will also be referred to herein as an "Issuer".

The token management server 500 is configured to communicate with the POS terminal 300 and the loyalty program server 600 via a wide area network 160, such as the Internet. The token management server 500 may also be configured to communicate with the communications appliance 200 via the mobile communications network 130. The token management server 500 may also communicate with or include an offer database that stores a plurality of loyalty tokens each in association with a respective offer identifier.

The loyalty program server 600 is associated with a loyalty program administrator, and is configured to communicate with the token management server 500, and optionally also with the authorization server 400, via a wide area network 160, such as the Internet. The loyalty program server 600 may also communicate with or include a rewards database that stores a plurality of offer identifiers each in association with at least one parameter of a loyalty points offer. The loyalty program server 600 may also communicate with or include a secondary ledger database that stores a plurality of records each uniquely associated with a respective secondary ledger and a secondary ledger identifier.

As will be discussed, the POS terminal 300 receives ledger data and a cryptogram from the communications appliance 200 within a single EMV-compliant data communication session with the communications appliance 200. The POS terminal 300 extracts a primary ledger identifier from the ledger data, and transmits to the authorization server 400, via the acquirer server 350, an authorization request message that includes the primary ledger identifier, the cryptogram and an authorization value. The POS terminal 300 receives an authorization response message from the authorization server 400 in response to the authorization request message. The authorization response message may confirm that the communications appliance 200 generated the cryptogram from the primary ledger identifier and the authorization value.

The POS terminal 300 may extract a loyalty token from the ledger data, and transmit the loyalty token to the token management server 500. The token management server 500 then initiates a loyalty points reward (via the loyalty program server 600) to a secondary ledger that is associated with the loyalty token.

Although the payment data processing network 100 is shown comprising only a single communications appliance 200, POS terminal 300, acquirer server 350, authorization server 400, token management server 500, and loyalty program server 600, the payment data processing network 100 typically includes a plurality of the communications appliances 200, a plurality of the POS terminals 300, a plurality of the acquirer servers 350, a plurality of the authorization servers 400, a plurality of the token management servers 500, and/or a plurality of the loyalty program servers 600. Further, although the authorization server 400, token management server 500, and loyalty program server 600 are depicted as distinct servers in FIG. 1, all or part of the functionality of the authorization server 400 may instead be implemented by the token management server 500. Similarly, all or part of the functionality implemented by the token management server 500 may instead be implemented by the loyalty program server 600.

Communications Appliance

Figure 2:
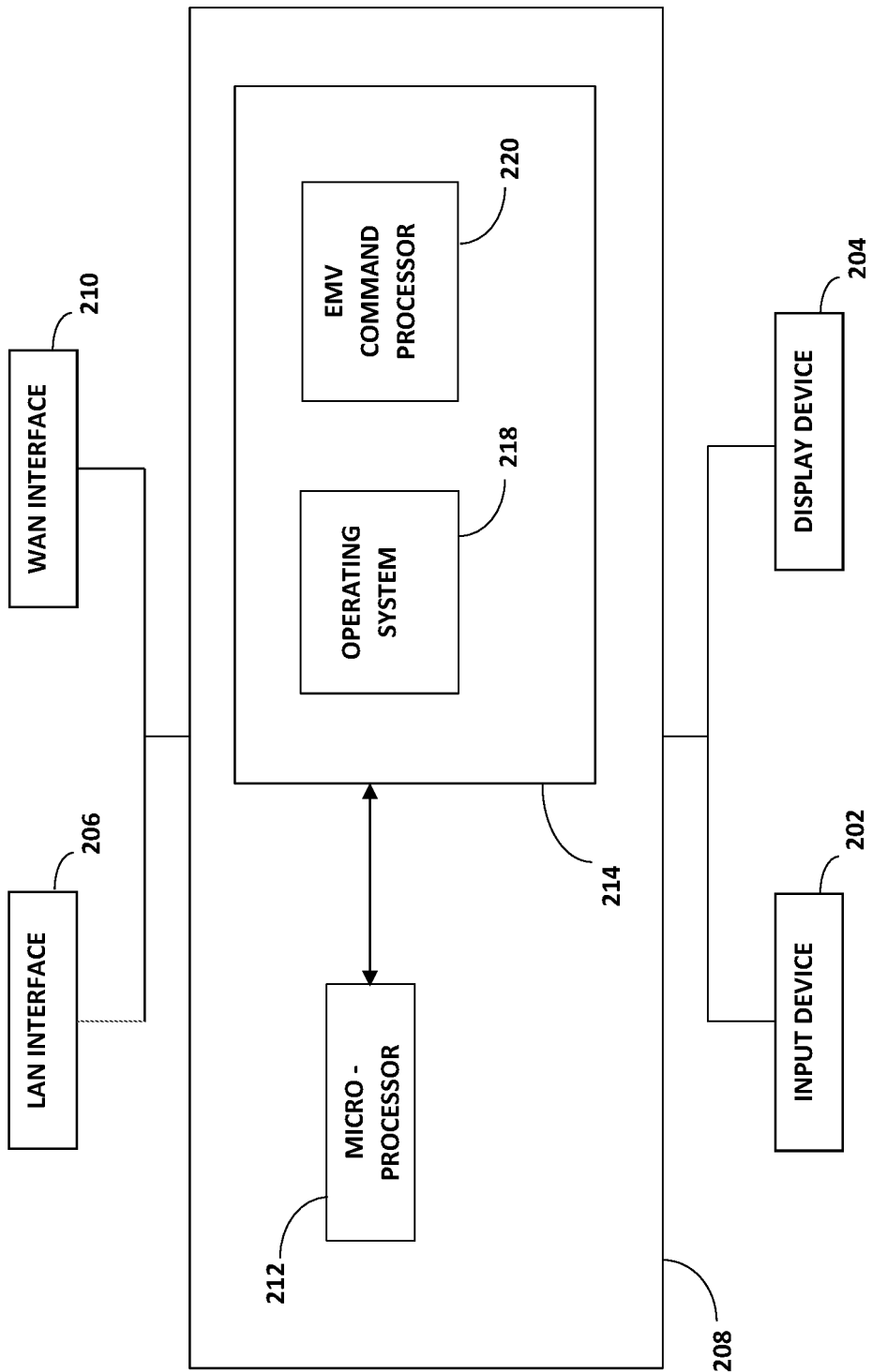
FIG. 2 is a schematic view of a communications appliance of the EMV-session data network.

The communications appliance 200 may be implemented as a portable communications device, such as a portable hardware token, a portable digital assistant (PDA), a tablet computer or a smartphone. Therefore, as shown in FIG. 2, the communications appliance 200 may include an input device 202, a display device 204, a local area network (LAN) interface 206, and a data processing system 208 that is coupled to the input device 202, the display device 204 and the LAN interface 206. Alternately, the communications appliance 200 may be implemented as an integrated circuit card that lacks the input device 202 and the display device 204, but implements the data processing system 208 via a built-in micro-controller and a protected memory.

The input device 202 may be implemented as a keyboard, touchpad, touchscreen or other input device suitable for allowing a user of the communications appliance 200 (customer) to input data and/or commands that may be required to complete a payment transaction with a merchant. The display device 204 may be implemented as a liquid crystal display (LCD) panel, plasma display panel, or other display device suitable for displaying information to the user of the communications appliance 200.

The LAN interface 206 allows the communications appliance 200 to communicate with the POS terminal 300. The LAN interface 206 may be configured as a wireless interface that allows the communications appliance 200 to communicate with the POS terminal 300 via a short-range wireless connection, such as a Bluetooth, a Near Field Communications (NFC) or a contactless integrated circuit card (ISO/IEC 14443) connection, as examples. Alternately, the LAN interface 206 may be configured as a wired interface that allows the communications appliance 200 to communicate with the POS terminal 300 via a wired connection, such as a Universal Serial Bus (USB) or a contact-type integrated circuit card (e.g. ISO/IEC 7816) connection, as examples.

The communications appliance 200 may optionally also include a wide area network (WAN) wireless interface 210 that is connected to the data processing system 208 and allows the communications appliance 200 to communicate with the token management server 500 (via the mobile communications network 130).

The data processing system 208 includes a microprocessor 212 and a non-transient computer-readable medium 214. The non-transient computer-readable medium 214 may be provided as non-volatile electronic computer memory (e.g. FLASH memory), as an example. The non-transient computer-readable medium (memory) 214 may store computer processing instructions which, when accessed from the memory 214 and executed by the microprocessor 212, implement at least an operating system 218 and an EMV command processor 220.

The operating system 218 allows the communications appliance 200 to accept user input from the input device 202 and to control the display device 204. The operating system 218 also allows the communications appliance 200 to communicate with the POS terminal 300 (via the LAN interface 206), and to communicate with the token management server 500 (via the WAN interface 210).

The communications appliance 200 implements payment card functionality requirements of the Europay Mastercard Visa (EMV) standard for payment transactions. Therefore, the POS terminal 300 is configured to establish an EMV-compliant communications session with the EMV command processor 220, and the EMV command processor 220 is configured to receive and respond to EMV commands received from the POS terminal 300 via the communications session.

The communications appliance 200 may be provided to the operator of the communications appliance 200 by the Issuer and, therefore, the communications appliance 200 may be pre-configured with the operating system 218 and the EMV command processor 220. Alternately, the communications appliance 200 may be provided by a third party, and the operator of the communications appliance 200 may download the EMV command processor 220 to the communications appliance 200 from a computer server operated by, or on behalf of, the Issuer.

In order to facilitate the implementation of the EMV payment card functionality, the communications appliance 200 is also configured with a primary ledger identifier that is associated with one of the primary ledgers that are stored in the primary ledger database of the authorization server 400. The primary ledger identifier may also be uniquely associated with the communications appliance 200.

If the communications appliance 200 is pre-configured with the EMV command processor 220, the Issuer may store the primary ledger identifier in the memory 214 when the Issuer installs the EMV command processor 220 in the memory 214. Therefore, a plurality of the communications appliances 200 may be deployed by, or on behalf of, the same Issuer.

Alternately, whether the communications appliance 200 is pre-configured with or subsequently downloads the EMV command processor 220, the EMV command processor 220 may be configured to download the primary ledger identifier from the Issuer (e.g. via the authorization server 400), and to store the primary ledger identifier in the memory 214. Therefore, a plurality of the communications appliances 200 may be configured by, or on behalf of, the same Issuer.

As discussed, the EMV command processor 220 is configured to receive and respond to EMV commands received from the POS terminal 300 via the communications session. Conversely, the POS terminal 300 may need one or more data elements from the communications appliance 200 in order to complete a payment transaction between the merchant and the customer. Therefore, during an EMV-compliant communications session established with the communications appliance 200, the EMV command processor 220 may receive from the POS terminal 300 a Read Record command requesting one or more data elements from the communications appliance 200. The EMV command processor 220 is configured to transmit ledger data to the POS terminal 300, during the EMV-compliant communications session, in response to the Read Record command.

For example, during an EMV-compliant communications session established with the EMV command processor 220, the EMV command processor 220 may receive from the POS terminal 300 a Read Record command requesting ledger data from the communications appliance 200. A discussed, the communications appliance 200 stores a primary ledger identifier in order to facilitate the implementation of the EMV payment card functionality. Therefore, the EMV command processor 220 may be configured to transmit the primary ledger identifier (ledger data) to the POS terminal 300, during the EMV-compliant communications session, in response to the Read Record command.

In one variation, in addition to the primary ledger identifier, the communications appliance 200 may also store an appliance identifier that is uniquely associated with the communications appliance 200, and may also store at least one loyalty token that is associated with one of the offer identifiers that are stored in the offer database of the token management server 500. In this variation, after the EMV command processor 220 receives from the POS terminal 300 a Read Record command requesting ledger data from the communications appliance 200, the EMV command processor 220 may be configured to transmit both the primary ledger identifier and the loyalty token (collectively ledger data) to the POS terminal 300, during the EMV-compliant communications session, in response to the Read Record command.

In this variation, if the communications appliance 200 is pre-configured with the EMV command processor 220, the Issuer may store the appliance identifier and the loyalty token(s) in the memory 214 when the Issuer installs the EMV command processor 220 in the memory 214. Alternately, whether the communications appliance 200 is pre-configured with or subsequently downloads the EMV command processor 220, the EMV command processor 220 may be configured to download the appliance identifier and the loyalty token(s) from the token management server 500, and to store the appliance identifier and the loyalty token(s) in the memory 214.

As will be discussed below, during the EMV-compliant communications session established with the communications appliance 200, the POS terminal 300 may determine whether the ledger data, received from the communications appliance 200 in in response to the Read Record command, includes a loyalty token. To facilitate that determination, the loyalty token stored on the communications appliance 200 may include a sequence of digits that is prefixed with an Issuer Identification Number (IIN) that identifies the Issuer as the issuer of the loyalty token.

The EMV command processor 220 may be configured to transmit the primary ledger identifier and the loyalty token, to the POS terminal 300, as separate data elements, in response to the Read Record command. Alternately, the EMV command processor 220 may be configured to generate a cypher from the primary ledger identifier and the loyalty token, and to transmit the cypher, to the POS terminal 300, as a single data element, in response to the Read Record command. As will be discussed, in this variation, the POS terminal 300 may recover the primary ledger identifier and the loyalty token from the cypher.

For example, the communications appliance 200 may store an appliance private asymmetric cryptographic key in the memory 214, and the EMV command processor 220 may be configured to implement an asymmetric cryptographic key algorithm, such as the RSA (Rivest-Shamir-Adleman) algorithm. The EMV command processor 220 may generate the cypher by applying the primary ledger identifier, the loyalty token and the appliance private cryptographic key as inputs to the asymmetric cryptographic key algorithm. Alternately, the communications appliance 200 may generate the cypher in advance of receiving the Read Record command, or may be pre-configured with the cypher when the loyalty token is stored in the communications appliance 200.

As will be discussed, in this variation, the POS terminal 300 may receive (from the communications appliance 200) an appliance public asymmetric cryptographic key corresponding to the appliance private asymmetric cryptographic key (i.e. the appliance private cryptographic key and the appliance public cryptographic key are an asymmetric cryptographic key pair), and may use the appliance public cryptographic key to recover the primary ledger identifier and the loyalty token from the cypher.

If the communications appliance 200 is pre-configured with the EMV command processor 220, the Issuer may store the appliance private cryptographic key (or the cypher) in the memory 214 when the Issuer installs the EMV command processor 220 in the memory 214. Alternately, whether the communications appliance 200 is pre-configured with or subsequently downloads the EMV command processor 220, the EMV command processor 220 may be configured to download the appliance private cryptographic key (or the cypher) from the token management server 500, for example, and to store the appliance private cryptographic key (cypher) in the memory 214.

During an EMV-compliant communications session established with the communications appliance 200, the EMV command processor 220 may also receive, from the POS terminal 300, a Generate Application Cryptogram command that includes at least one command parameter and requests a cryptogram generated by the communications appliance 200 from the data parameter(s). The EMV command processor 220 is also configured to generate a cryptogram from at least the command parameter(s), and to transmit the cryptogram to the POS terminal 300, during the EMV-compliant communications session, in response to the Generate Application Cryptogram command.

For example, the communications appliance 200 may store a master symmetric cryptographic key in the memory 214, and the EMV command processor 220 may be configured to implement a symmetric cryptographic key algorithm, such as AES or DES. During an EMV-compliant communications session established with the communications appliance 200, the EMV command processor 220 may receive, from the POS terminal 300, a Generate Application Cryptogram command that identifies the payment amount ("authorization value") required to complete the payment transaction between the merchant and the customer, and may generate the cryptogram from at least the authorization value and the master cryptographic key.

The master cryptographic key may be uniquely associated with the communications appliance 200. As will be discussed, the authorization server 400 may store a copy of the master cryptographic key, and may use the master cryptographic key to confirm that the communications appliance 200 generated the cryptogram from at least the authorization value.

The EMV command processor 220 may be configured to generate the cryptogram, in this example, by (i) generating a session key by applying at least the master cryptographic key as an input to a key generation algorithm, and (ii) generating an encrypted message authentication code by applying at least the primary ledger identifier, the authorization value and the session key as inputs to the symmetric cryptographic key algorithm. In this example the authorization server 400 may use the master cryptographic key to confirm that the communications appliance 200 generated the cryptogram from the authorization value and the primary ledger identifier.

If the communications appliance 200 is pre-configured with the EMV command processor 220, the Issuer may store the master cryptographic key in the memory 214 when the Issuer installs the EMV command processor 220 in the memory 214. Alternately, whether the communications appliance 200 is pre-configured with or subsequently downloads the EMV command processor 220, the EMV command processor 220 may be configured to download the master cryptographic key from a computer server operated by, or on behalf of, the Issuer.

POS Terminal

As non-limiting examples, the POS terminal 300 may be implemented as an integrated point-of-sale terminal, or as a pin-pad device that communicates with an electronic cash register (ECR). As will become apparent, each POS terminal 300 is configured to receive a unique data structure (ledger data) from the communications appliances 200 during EMV-compliant communications sessions with the communications appliances 200. Since a plurality of the communications appliance 200 may be deployed by, or on behalf of, the same Issuer, a plurality of the POS terminals 300 may likewise be deployed by, or on behalf of, the same Issuer.

Figure 3:
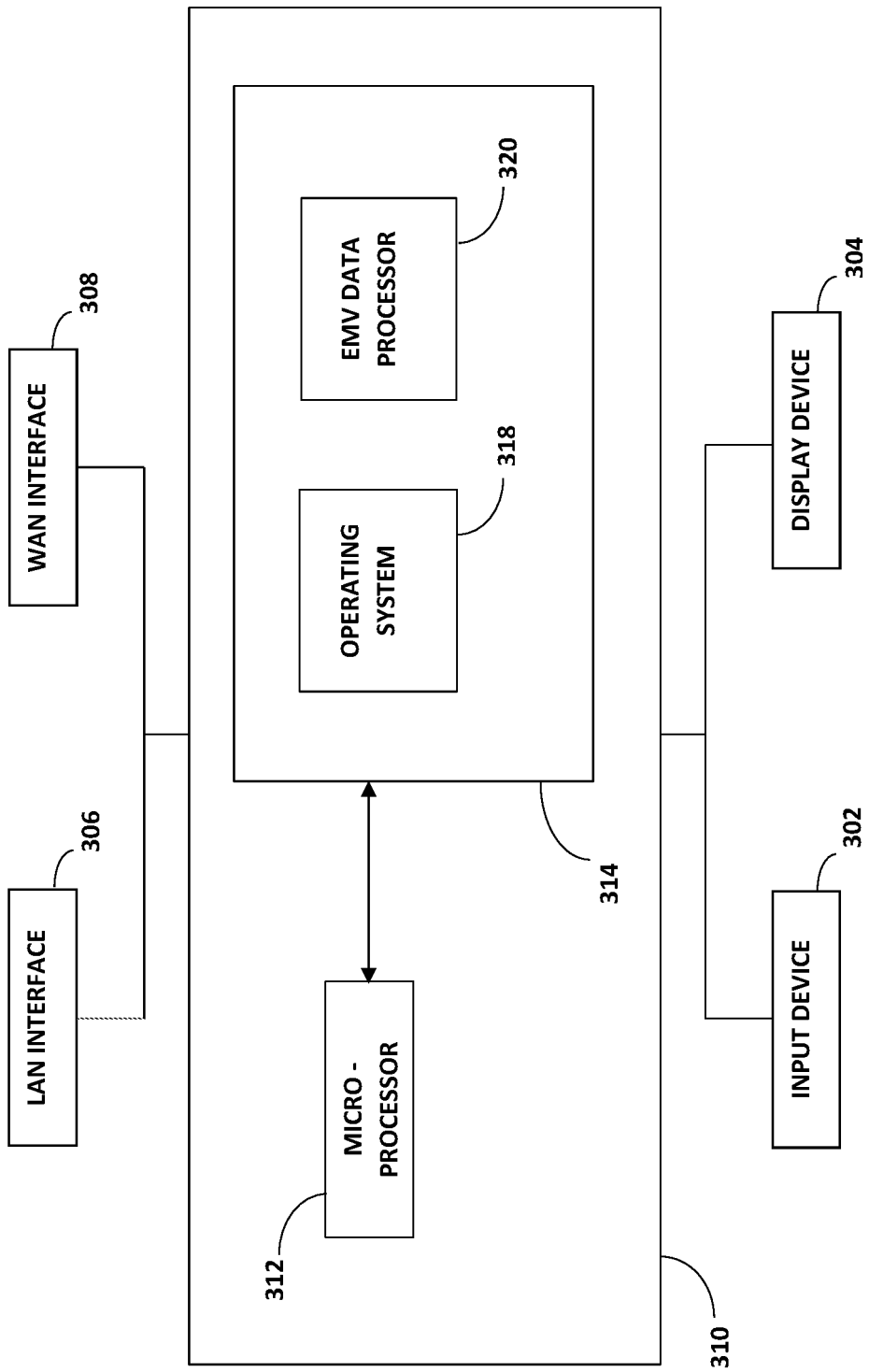
FIG. 3 is a schematic view of a POS terminal of the EMV-session data network.

As shown in FIG. 3, the POS terminal 300 includes an input device 302, a display device 304, a local area network (LAN) interface 306, a wide area network (WAN) interface 308, and a data processing system 310 that is in communication with the input device 302, the display device 304, the LAN interface 306 and the WAN interface 308.

The input device 302 may be implemented as a keyboard, touchpad, touchscreen or other input device suitable for allowing a user of the payment terminal 300 to input data and/or commands that may be required to complete the financial transaction. The display device 204 may be implemented as a liquid crystal display (LCD) panel, plasma display panel, or other display device suitable for displaying information to the user of the POS terminal 300.

The LAN interface 306 allows the POS terminal 300 to communicate with the communications appliance 200. The LAN interface 306 may be configured as a wireless interface that allows the POS terminal 300 to communicate with the communications appliance 200 via a short-range wireless connection, such as a Bluetooth, a Near Field Communications (NFC) or a contactless integrated circuit card (ISO/IEC 14443) connection, as examples. Alternately, the LAN interface 306 may be configured as a wired interface that allows the POS terminal 300 to communicate with the communications appliance 200 via a wired connection, such as a Universal Serial Bus (USB) or a contact-type integrated circuit card (e.g. ISO/IEC 7816) connection, as examples.

The WAN interface 308 allows the POS terminal 300 to communicate with the acquirer server 350 (via the acquirer network 140) and with the token management server 500 (via a wide area network 160, such as the Internet).

The data processing system 310 includes a microprocessor 312 and a non-transient computer-readable medium 314.

The non-transient computer-readable medium 314 may be provided as non-volatile electronic computer memory (e.g. FLASH memory), as an example. The non-transient computer-readable medium (memory) 314 may store computer processing instructions which, when accessed from the memory 314 and executed by the microprocessor 312, implement at least an operating system 318 and an EMV data processor 320.

The operating system 318 allows the POS terminal 300 to accept user input from the input device 302 and to control the display device 304. The operating system 318 also allows the POS terminal 300 to communicate with the communications appliance 200 (via the LAN interface 306), and to communicate with the authorization server 400 (via the WAN interface 308).

The POS terminal 300 implements payment card functionality requirements of the EMV standard for payment transactions. Therefore, the EMV data processor 320 is configured to establish an EMV-compliant communications session with the communications appliance 200, and to transmit EMV commands to (and receive EMV-compliant responses from) the communications appliance 200 via the communications session.

The POS terminal 300 may need one or more data elements from the communications appliance 200 in order to complete the payment transaction between the merchant and the customer. Therefore, the EMV data processor 320 is configured to transmit to the communications appliance 200, during an EMV-compliant communications session established with the communications appliance 200, a Read Record command requesting one or more data elements from the communications appliance 200. The communications appliance 200 may transmit ledger data to the POS terminal 300, during the EMV-compliant communications session, in response to the Read Record command.

For example, the EMV data processor 320 may be configured to transmit to the communications appliance 200, during the EMV-compliant communications session established with the communications appliance 200, a Read Record command requesting an account number from the communications appliance 200. As discussed, the communications appliance 200 stores a primary ledger identifier that is associated with one of the primary ledgers that are stored in the primary ledger database of the authorization server 400. Therefore, the communications appliance 200 may transmit a primary ledger identifier to the POS terminal 300, during the EMV-compliant communications session, in response to the Read Record command.

The EMV data processor 320 is also configured to transmit to the communications appliance 200, during an EMV-compliant communications session established with the communications appliance 200, a Generate Application Cryptogram command that includes at least one command parameter and requests a cryptogram generated by the communications appliance 200 from the command parameter(s). The communications appliance 200 may transmit the cryptogram to the POS terminal 300, during the EMV-compliant communications session, in response to the Generate Application Cryptogram command.

The EMV data processor 320 is also configured to request authorization for the payment transaction between the merchant and the customer by transmitting at least the cryptogram to a computer server.

For example, the EMV data processor 320 may be configured to transmit to the communications appliance 200, during the EMV-compliant communications session established with the communications appliance 200, a Generate Application Cryptogram command that identifies the authorization value required to complete a payment transaction between the merchant and the customer. As discussed, the communications appliance 200 stores a master cryptographic key that may be uniquely associated with the communications appliance 200. Therefore, the communications appliance 200 may generate the cryptogram from at least the authorization value, the primary ledger identifier and the master cryptographic key, and may transmit the cryptogram to the POS terminal 300, during the EMV-compliant communications session, in response to the Generate Application Cryptogram command.

The EMV data processor 320 may be configured to request authorization for the payment transaction, in this example, by incorporating the primary ledger identifier, the cryptogram and the authorization value into an authorization request message, and transmitting the authorization request message to the authorization server 400. As will be explained, the authorization server 400 may respond to the authorization request message by transmitting to the POS terminal 300 an authorization response message confirming that the communications appliance 200 generated the cryptogram from the primary ledger identifier and the authorization value.

Alternately, as discussed, in one variation the communications appliance 200 may store one or more loyalty tokens in addition to a primary ledger identifier, and the communications appliance 200 may transmit both the primary ledger identifier and one of the loyalty tokens to the POS terminal 300, during the EMV-compliant communications session, in response to the Read Record command. The EMV data processor 320 may be configured to request authorization for the payment transaction, in this variation, by extracting the primary ledger identifier from the ledger data (received from the communications appliance 200 in response to the Read Record command), incorporating the extracted primary ledger identifier, the cryptogram and the authorization value into the authorization request message, and transmitting the authorization request message to the authorization server 400.

As discussed, the communications appliance 200 may generate a cypher by applying the primary ledger identifier, the loyalty token and the appliance private cryptographic key (stored in the communications appliance 200) as inputs to an asymmetric cryptographic key algorithm, and may transmit the cypher, to the POS terminal 300, as a single data element, in response to the Read Record command. In this variation, the POS terminal 300 may receive the appliance public cryptographic key from the communications appliance 200, and the EMV data processor 320 may be configured to recover the primary ledger identifier and the loyalty token from the ledger data (cypher) by applying the cypher and the appliance public cryptographic key as inputs to the asymmetric cryptographic key algorithm.

The EMV data processor 320 is configured to extract a loyalty token (if present) from the ledger data received from the communications appliance 200 (in response to the Read Record command). As discussed above, the loyalty token, if included in the ledger data, may include a sequence of digits that is prefixed with an Issuer Identification Number (IIN) that identifies the Issuer as the issuer of the loyalty token. Therefore, the EMV data processor 320 may be configured with a local database of IIN's that are associated with the Issuer, and may determine whether the ledger data includes a loyalty token by comparing the ledger data against the IIN's stored in the POS terminal 300.

The EMV data processor 320 is also configured to transmit to the token management server 500 a loyalty rewards request message that includes the loyalty token. As will be explained, the token management server 500 may respond to the loyalty rewards request message by initiating a loyalty points reward (via the loyalty program server 600) to a secondary ledger that is associated with the loyalty token. Optionally, the loyalty rewards request message may also include the authorization value, and the loyalty program server 600 may use the authorization value to determine the quantum of the loyalty points reward.

The EMV data processor 320 may also be configured to receive (e.g. from the authorization server 400) a rewards response message advising of the loyalty points awarded to the secondary ledger.

Although the EMV data processor 320 is typically implemented as computer processing instructions, all or a portion of the functionality of the EMV data processor 320 may be implemented instead in electronics hardware, such as a field programmable logic gate array (FPGA) or a complex programmable logic device (CPLD).

Authorization Server 400

Figure 4:
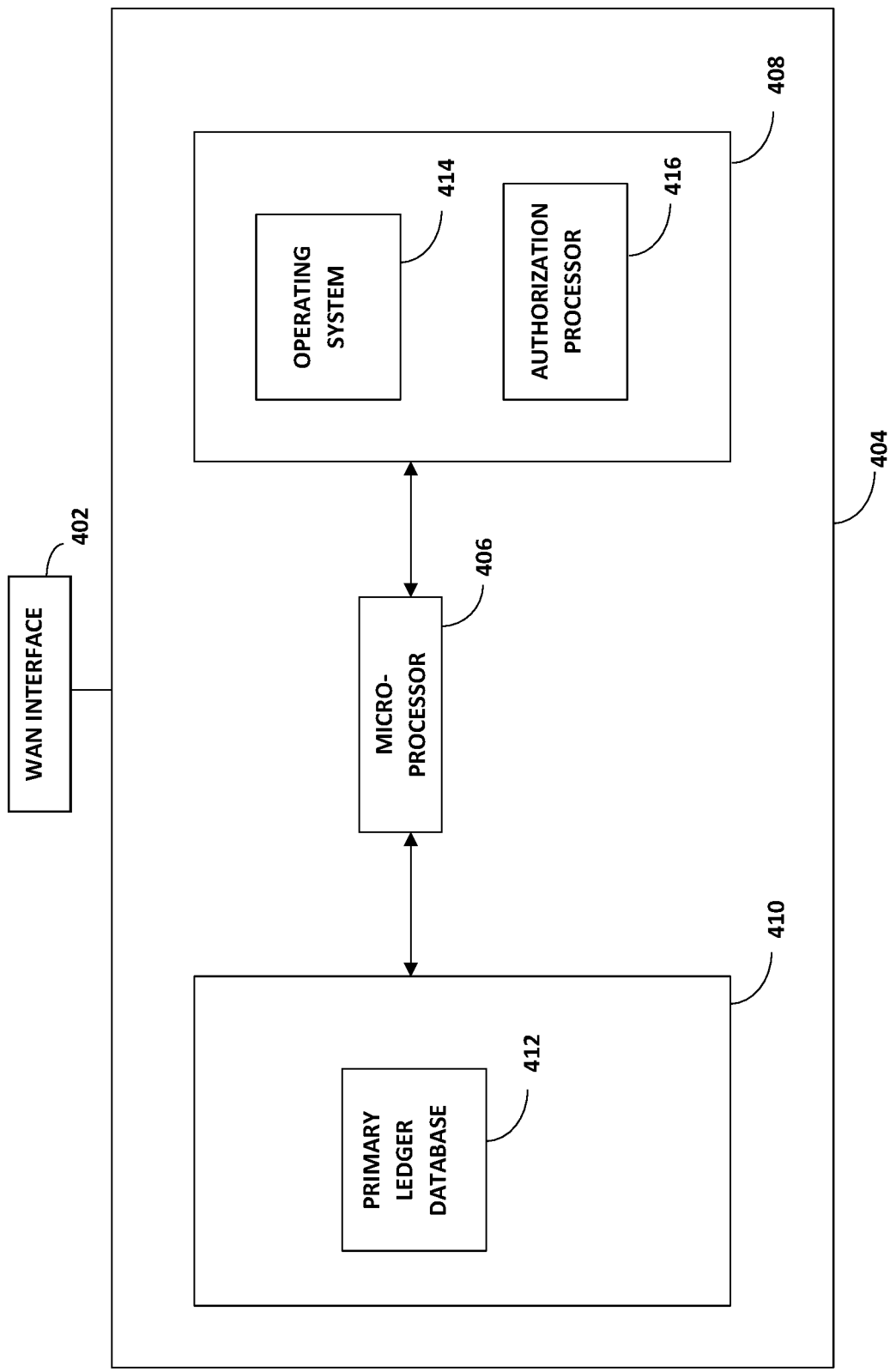
FIG. 4 is a schematic view of the authorization server.

The authorization server 400 may be implemented as a computer server. As shown in FIG. 4, the authorization server 400 may include a wide area network (WAN) interface 402 and a data processing system 404 that is coupled to the WAN interface 402.

The WAN interface 402 interfaces the authorization server 400 with the POS terminal(s) 300 via the acquirer server(s) 350 and the associated acquirer network 140. The WAN interface 402 may also interface the authorization server 400 with the loyalty program server 600.

The data processing system 404 includes one or more microprocessors 406, a volatile computer-readable memory 408 and a non-transient computer-readable medium 410. The non-transient computer-readable medium 410 may be provided as one or more of a magnetic storage drive and a solid-state drive.

The computer-readable medium 410 may store a secure primary ledger database 412. Alternately, the primary ledger database 412 may be deployed on a database server (not shown) that is distinct from the authorization server 400, and the authorization server 400 may be configured to access the primary ledger database 412 via a secure communications channel.

The primary ledger database 412 may include a plurality of database records each uniquely associated with a respective primary ledger and a respective one of the primary ledger identifiers. Each database record identifies the associated primary ledger identifier, and deposit/withdrawal/credit entries to the associated primary ledger. Optionally, each database record may also include a secondary ledger identifier that is associated with a secondary ledger maintained by the loyalty program administrator.

The Issuer may ensure that each primary ledger identifier is unique within the primary ledger database 412 by saving each new primary ledger identifier in the primary ledger database 412 only after confirming that the Issuer has not previously saved the primary ledger identifier in the primary ledger database 412. Further, as discussed, each primary ledger identifier may be uniquely associated with a respective communications appliance 200. Therefore, before a communications appliance 200 is pre-configured with a particular primary ledger identifier (or a particular primary ledger identifier is downloaded from the authorization server 400, for example, and installed on a communications appliance 200 by the respective EMV command processor 220), the Issuer may ensure that a communications appliance 200 has not been previously pre-configured with the same primary ledger identifier, or the same primary ledger identifier has not been previously downloaded to a communications appliance 200.

The computer-readable medium 410 also maintains computer processing instructions stored thereon which, when copied into the volatile computer-readable memory 408, and executed by the microprocessor(s) 406 from the volatile computer-readable memory 408, implement at least an operating system 414 and an authorization processor 416.

The operating system 414 allows the authorization server 400 to at least communicate with the POS terminal 300 (via the WAN interface 402) and optionally also communicate with the loyalty program server 600 (via the WAN interface 402).

The authorization processor 416 is configured to receive an authorization request message from one of the POS terminals 300 via the associated acquirer network 140 and acquirer server 350. As discussed, the authorization request message includes an authorization value, and also includes the primary ledger identifier and the cryptogram which the POS terminal 300 received from the communications appliance 200.

The authorization processor 416 is configured to determine from the authorization request message whether the communications appliance 200 generated the cryptogram from at least the authorization value, and to generate an authorization response message indicating whether the authorization processor 416 determined that the communications appliance generated the cryptogram from at least the authorization value. The authorization processor 416 is also configured to transmit the authorization response message to the POS terminal 300, via the acquirer server 350 and the associated acquirer network 140, in response to the authorization request message.

The authorization request message at least implicitly requests authorization for a payment transaction characterized by the primary ledger identifier and the authorization value. Therefore, the authorization response message at least implicitly confirms that the payment transaction, characterized by the primary ledger identifier and the authorization value, was authorized.

As noted above, the database record that is associated with the primary ledger identifier in the primary ledger database 412 identifies at least deposit/withdrawal entries to the associated primary ledger. Therefore, the authorization request message at least implicitly requests authorization for a payment transaction, from the primary ledger that is associated with the primary ledger identifier, in an amount equal to the authorization value. Similarly, the authorization response message at least implicitly confirms that the primary ledger that is associated with the primary ledger identifier is still active and has sufficient credit/funds to complete the payment transaction.

As discussed, the communications appliance 200 may store a master symmetric cryptographic key, and may generate the cryptogram from at least the authorization value and the master cryptographic key. Therefore, the authorization server 400 may store a copy of the master cryptographic key in the memory 410, and the authorization processor 416 may be configured to implement a symmetric cryptographic key algorithm, such as AES or DES, and may be further configured to use the master cryptographic key to confirm that the communications appliance 200 generated the cryptogram.

For example, as discussed, the communications appliance 200 may generate the cryptogram by (i) generating a session key by applying at least the master cryptographic key as an input to a key generation algorithm, and (ii) generating an encrypted message authentication code by applying at least the primary ledger identifier, the authorization value and the session key as inputs to the symmetric cryptographic key algorithm. The master cryptographic key may be uniquely associated with the communications appliance 200, and the authorization processor 416 may be configured to confirm that the communications appliance 200 generated the cryptogram (encrypted message authentication code), in this example, by (i) recovering the session key by applying at least the master cryptographic key as an input to a symmetric cryptographic key algorithm, (ii) decrypting the encrypted message authentication code by applying the encrypted message authentication code and the session key as inputs to the symmetric cryptographic key algorithm, (iii) computing a message authentication code from at least the primary ledger identifier and the authorization value, and (iv) comparing the computed message authentication code against the decrypted message authentication code.

The Issuer may generate each master symmetric cryptographic key from a noise generator or pseudo-random number generator, as examples, and may store the master symmetric cryptographic key in the memory 410 (in the primary ledger database 412, as an example) in association with the primary ledger identifier. The authorization processor 416 may be configured to recover the master symmetric cryptographic key from the primary ledger identifier, in this example, by querying the memory 410 with the primary ledger identifier (received in the authorization request message).

Before a communications appliance 200 is pre-configured with the master cryptographic key (or the master cryptographic key is downloaded to and installed on a communications appliance 200), the Issuer may ensure that the master cryptographic key is uniquely associated with the communications appliance 200 by saving the master cryptographic key in the memory 410 (primary ledger database 412) only after confirming that the Issuer has not previously saved the master cryptographic key in the memory 410.

Alternately, instead of saving each master cryptographic key in the memory 410 (primary ledger database 412), and independently of ensuring that each master cryptographic key is uniquely associated with the respective communications appliance 200, the Issuer may generate each master cryptographic key by applying the primary ledger identifier and an Issuer cryptographic key as inputs to a cryptographic hash algorithm that has acceptable collision resistance, such as SHA-2. The authorization processor 416 may be configured to recover the master cryptographic key from the primary ledger identifier, in this example, by applying the primary ledger identifier (received in the authorization request message) and the Issuer cryptographic key as inputs to the cryptographic hash algorithm.

As noted above, the authorization response message at least implicitly confirms that the payment transaction, characterized by the primary ledger identifier and the authorization value, was authorized. Therefore, the authorization processor 416 may incorporate into the authorization response message an authorization code that indicates whether the authorization processor 416 determined that the communications appliance 200 generated the cryptogram from at least the authorization value.

As also noted above, the POS terminal 300 may transmit to the token management server 500 a loyalty rewards request message that includes a loyalty token received from the communications appliance 200. In response, the token management server 500 may initiate a loyalty points reward to a secondary ledger that is associated with the loyalty token by (i) generating an offer identifier from the loyalty token, and (ii) transmitting the offer identifier to the loyalty program server 600.

The loyalty program server 600 may apply the loyalty points reward to the secondary ledger. The loyalty program server 600 may also notify the authorization server 400 of the loyalty points reward by transmitting to the authorization server 400 a rewards confirmation message that includes (i) a secondary ledger identifier that is associated with the secondary ledger, and (ii) the current balance of loyalty points rewards in the secondary ledger (updated after the last loyalty points reward was applied to the secondary ledger). Therefore, in addition to incorporating the authorization code into the authorization response message, the authorization processor 416 may also incorporate at least the loyalty points reward balance into the authorization response message.

As noted above, each database record of the primary ledger database 412 may store a primary ledger identifier and a primary ledger in association with a secondary ledger identifier. In addition to the deposit/withdrawal entries to the primary ledger, each primary ledger may also store the current loyalty points rewards balance (as updated from the last rewards confirmation message). Therefore, the authorization processor 416 may be configured to incorporate the loyalty points reward balance into the authorization response message by (i) locating the primary ledger that is associated with the primary ledger identifier in the primary ledger database 412, and (ii) extracting the loyalty points reward balance from the located primary ledger, and (iii) inserting the extracted loyalty points reward balance into the authorization response message.

After authorization processor 416 incorporates the loyalty points reward balance into the authorization response message (i.e. after the authorization processor 416 finishes generating the authorization response message), the authorization processor 416 may update the primary ledger database 412 with the current loyalty points reward balance. The authorization processor 416 may be configured to update the primary ledger database 412 by (i) receiving the rewards confirmation message from the loyalty program server 600, (ii) extracting the secondary ledger identifier and the loyalty points reward balance from the rewards confirmation message, (iii) locating the primary ledger that is associated with the secondary ledger identifier in the primary ledger database 412, and (iv) saving the loyalty points reward balance in the located primary ledger.

As noted above, the authorization server 400 transmits the authorization response message to the POS terminal 300. Therefore, in addition to indicating whether the payment transaction was authorized (i.e. from the authorization code), with the foregoing approach the POS terminal 300 may also display the loyalty points reward balance of the secondary ledger. Since the authorization server 400 receives the rewards confirmation message from the loyalty program server 600 after the authorization server 400 finishes generating the authorization response message, the POS terminal 300 will display the loyalty points reward balance current as of the last loyalty points reward (i.e. not as of the loyalty points reward currently being applied to the secondary ledger). However, since the authorization server 400 reads the loyalty points reward balance from the primary ledger database 412 (instead of, for example, waiting for the rewards confirmation message (if any)), the authorization server 400 transmits the authorization response message to the POS terminal 300 within the time constraints of the EMV specification.

Token Management Server 500

Figure 5:
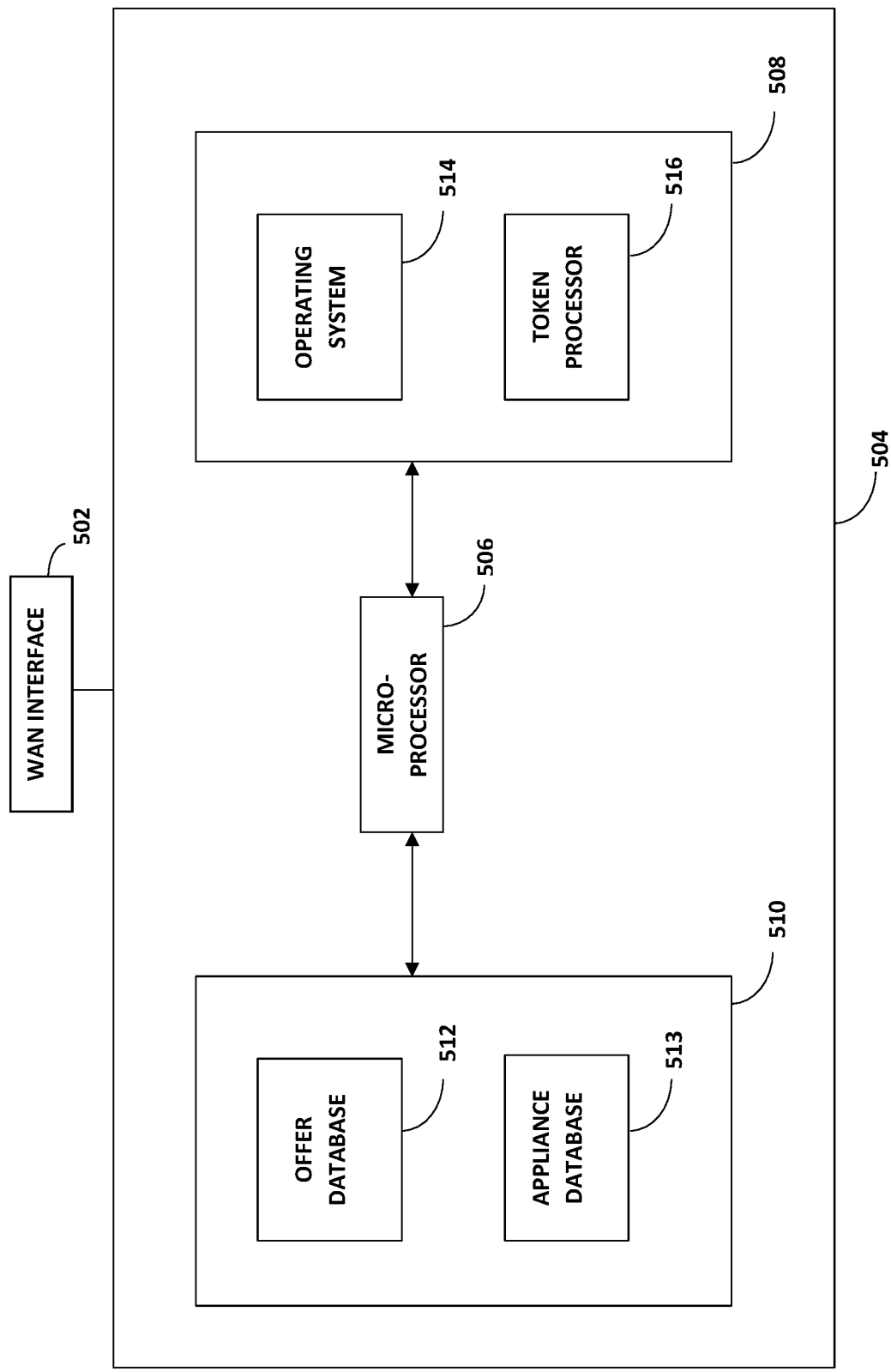
FIG. 5 is a schematic view of a token management server of the EMV-session data network.

The token management server 500 may be implemented as a computer server. As shown in FIG. 5, the authorization server 400 may include a wide area network (WAN) interface 502 and a data processing system 504 that is coupled to the WAN interface 502.

The WAN interface 502 interfaces the token management server 500 with the POS terminal(s) 300 and the loyalty program server 600 via a wide area network 160, such as the Internet. The WAN interface 502 may also interface the token management server 500 with the communications appliance(s) 200 via the mobile communications network 130.

The data processing system 504 includes one or more microprocessors 506, a volatile computer-readable memory 508 and a non-transient computer-readable medium 510. The non-transient computer-readable medium 510 may be provided as one or more of a magnetic storage drive and a solid-state drive.

The computer-readable medium 510 may store an offer database 512, and an appliance database 513. Alternately, the offer database 512 and/or the appliance database 513 may be deployed on a database server (not shown) that is distinct from the token management server 500, and the token management server 500 may be configured to access the offer database 512 and/or the appliance database 513 via a secure communications channel.

The offer database 512 may include a plurality of database records each associated with a respective loyalty points offer. Each database record of the offer database 512 stores an offer identifier in association with a respective a loyalty token. As will be explained, the offer identifier identifies a pending loyalty points offer that has been made available to a consumer by a loyalty program administrator.

The appliance database 513 may include a plurality of database records each associated with a respective communications appliance 200. Each database record of the appliance database 513 stores an appliance identifier in association with a secondary ledger identifier. As will be explained, a pending loyalty points offer may be restricted for use (redemption) with a plurality of secondary ledgers and, therefore, the token management server 500 may use the identifier mappings stored in the appliance database 514 to download the loyalty tokens to the appropriate communications appliances 200.

The computer-readable medium 510 also maintains computer processing instructions stored thereon which, when copied into the volatile computer-readable memory 508, and executed by the microprocessor(s) 506 from the volatile computer-readable memory 508, implement at least an operating system 514 and a token processor 516.

The operating system 514 allows the token management server 500 to at least communicate with the communications appliance 200 (via the mobile communications network 130), and with the POS terminal 300 and the loyalty program server 600 (via the wide area network 160).

As discussed above, if the ledger data (received from the communications appliance 200 in response to the Read Record command) includes a loyalty token, the POS terminal 300 may transmit to the token management server 500 (via the acquirer network 140 and the acquirer server 350) a loyalty rewards request message that includes the loyalty token. The token processor 516 is configured to receive the loyalty rewards request message, and to respond to the loyalty rewards request message by initiating a loyalty points reward to a secondary ledger that is associated with the loyalty token.

The token processor 516 may be configured to initiate the loyalty points reward by extracting the loyalty token from the loyalty rewards request message, generating an offer identifier from the loyalty token, and transmitting the offer identifier to the loyalty program server 600. The token processor 516 may generate the offer identifier by recovering the offer identifier that is associated with the loyalty token in the offer database 512.

As discussed above, the loyalty rewards request message may include the authorization value, in addition to the loyalty token. Therefore, the token processor 516 may optionally transmit the authorization value to the loyalty program server 600, together with the offer identifier.

As noted above, the offer identifier identifies a pending loyalty points offer that has been made available to a consumer by a loyalty program administrator. The loyalty program administrator may associate an offer identifier with a pending loyalty points offer, and may restrict the pending loyalty points offer for use (redemption) with a specific secondary ledger. Therefore, before the token management server 500 receives (from the POS terminal 300) the loyalty token that is associated with the offer identifier, the token management server 500 may receive the offer identifier from the loyalty program server 600 together with a secondary ledger identifier that is associated with that specific secondary ledger. The token processor 516 may be configured to generate the loyalty token, and to save the loyalty token in the offer database 512 in association with the offer identifier.

The token processor 516 may also be configured to transmit the loyalty token to the communications appliance 200 (via the mobile communications network 130) that is associated with the received secondary ledger identifier. In this variation, the token processor 516 may transmit the loyalty token only to the specified communications appliance 200 by (i) using the received secondary ledger identifier to locate the associated appliance identifier (e.g. by querying the appliance database 513 with the secondary ledger identifier), and (ii) using a push notification service to download the loyalty token only to the communications appliance 200 having the located appliance identifier.

The token processor 516 may generate the loyalty token from a noise generator or pseudo-random number generator, as examples. Alternately, the token processor 516 may generate the loyalty token by applying the offer identifier and a master cryptographic key, for example, as inputs to a cryptographic hash algorithm that has acceptable collision resistance, such as SHA-2.

Further, as discussed, the loyalty token may include a sequence of digits that is prefixed with an Issuer Identification Number (IIN) that identifies the Issuer as the issuer of the loyalty token. Therefore, the token processor 516 may generate the loyalty token by prefixing the Issuer's IIN to the output of the noise generator, pseudo-random number generator or cryptographic hash algorithm, as applicable. The token processor 516 may also ensure that the loyalty token is uniquely associated with the offer identifier by saving the loyalty token in the offer database 512 only after confirming that the loyalty token has not been previously saved in the offer database 512.

Alternately, instead of the token management server 500 transmitting loyalty tokens to the communications appliance 200, the communications appliance 200 may be pre-configured with one or more loyalty tokens. If the communications appliance 200 is pre-configured with the EMV command processor 220, the Issuer may store the loyalty token(s) in the memory 214 of the communications appliance 200 and provide the token management server 500 with the loyalty token(s) when the Issuer installs the EMV command processor 220 in the memory 214. In this variation, the token processor 516 may be configured to save the offer identifier in the offer database 512 in association with a respective loyalty token when the token management server 500 receives the offer identifier from the loyalty program server 600.

Loyalty Program Server

Figure 6:
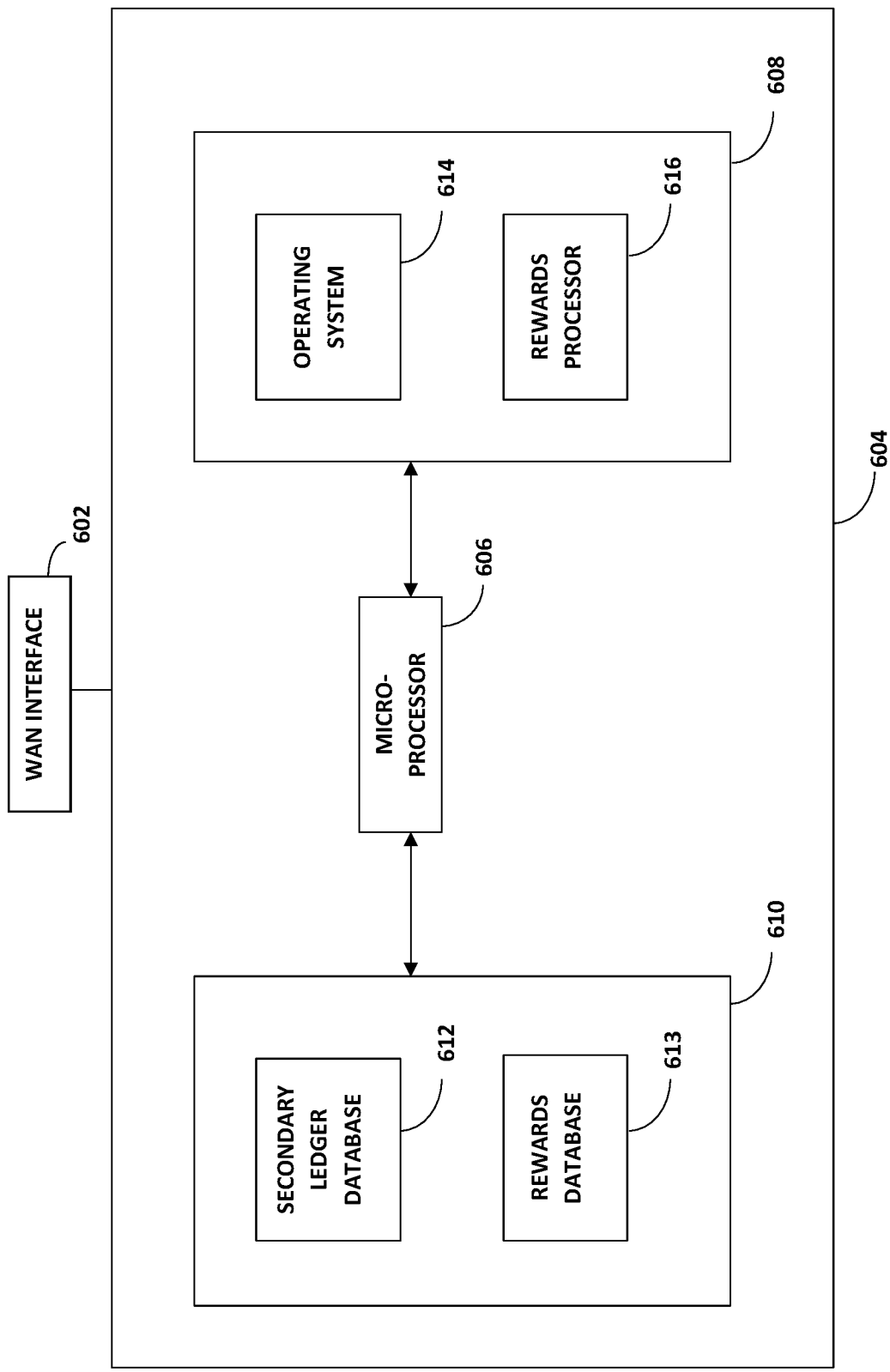
FIG. 6 is a schematic view of the loyalty program server.

The loyalty program server 600 may be administered by a loyalty program administrator, and may be implemented as a computer server. As shown in FIG. 6, the loyalty program server 600 may include a wide area network (WAN) interface 602, and a data processing subsystem 604 that is coupled to the WAN interface 602. The WAN interface 602 interfaces the loyalty program server 600 with the token management server 500 via a wide area network 160, such as the Internet. The WAN interface 602 may also interface the loyalty program server 600 with the authorization server 400.

The data processing system 604 includes one or more microprocessors 606, a volatile computer-readable memory 608 and a non-transient computer-readable medium 610. The non-transient computer-readable medium 610 may be provided as one or more of a magnetic storage drive and a solid-state drive.

The computer-readable medium 610 may store a secure secondary ledger database 612 and a rewards database 613. Alternately, the secondary ledger database 612 and/or the rewards database 613 may be deployed on database servers (not shown) that are distinct from the loyalty program server 600, and the loyalty program server 600 may be configured to access the secondary ledger database 612 and/or the rewards database 613 via secure communications channels.

The secondary ledger database 612 may include a plurality of database records each uniquely associated with a respective secondary ledger and a secondary ledger identifier. Each database record of the secondary ledger database 612 identifies the associated secondary ledger identifier, and loyalty point reward/redeem entries to the associated secondary ledger. The loyalty program administrator may ensure that each secondary ledger identifier is unique within the secondary ledger database 612 by saving each new secondary ledger identifier in the secondary ledger database 612 only after confirming that the administrator has not previously saved the secondary ledger identifier in the secondary ledger database 612.

The loyalty program administrator may make one or more loyalty points offers available to consumers, and the rewards database 613 may include a plurality of database records each associated with a respective pending loyalty points offer. Each database record stores an offer identifier that identifies the respective loyalty points offer, and also stores (in association with the offer identifier) the secondary ledger identifier of the secondary ledger to which the loyalty points reward (if any) may be applied. However, each offer identifier excludes particulars of the secondary ledger to which the loyalty points reward (if any) may be applied.

Further, for each loyalty points offer, the loyalty program administrator may establish one or more offer parameters which, when evaluated, determine whether loyalty points may be rewarded for a particular payment transaction, and the magnitude of that reward. Therefore, each database record of the rewards database 613 may also store the offer parameter(s) of the respective loyalty points offer, in association with the respective offer identifier and the secondary ledger identifier of the secondary ledger to which the reward may be applied.

The computer-readable medium 610 also maintains computer processing instructions stored thereon which, when copied into the volatile computer-readable memory 608, and executed by the microprocessor(s) 606 from the volatile computer-readable memory 608, implement at least an operating system 614 and a rewards processor 616.

The operating system 614 allows the loyalty program server 600 to at least communicate with the authorization server 400 and with the token management server 500.

As discussed above, after the token management server 500 receives a loyalty rewards request (that includes a loyalty token and optionally also includes an authorization value) from a POS terminal 300, the token management server 500 initiates a loyalty points reward (to the secondary ledger that is associated with the loyalty token) by extracting the loyalty token from the loyalty rewards request message, generating an offer identifier from the loyalty token, and transmitting the offer identifier to the loyalty program server 600. The loyalty program server 600 may then determine the quantum (if any) of the loyalty points reward, and apply the loyalty points reward to the secondary ledger that is associated with the offer identifier.

The rewards processor 616 may be configured to determine the quantum of the loyalty points reward by (i) locating in the rewards database 613 the pending loyalty points offer that is associated with the offer identifier received from the token management server 500 (e.g. by querying the rewards database 613 with the offer identifier received back from the token management server 500), and (ii) evaluating the offer parameter(s) associated with the located loyalty points offer.

For example, the offer parameter(s) associated with the located loyalty points offer may identify a fixed loyalty points reward, and the rewards processor 616 may use the fixed loyalty points reward as the quantum of the loyalty points reward.

In one variation, the offer parameter(s) may identify a fixed rewards rate, the token management server 500 may transmit a transaction amount to the loyalty program server 600 (e.g. together with the offer identifier), and the rewards processor 616 may determine the quantum of the loyalty points rewards from the transaction amount and from the fixed rewards rate of the located loyalty points offer (e.g. by multiplying the transaction amount by the fixed rewards rate).

In another variation, the offer parameter(s) may identify a variable rewards rate (e.g. a rewards rate that varies with the transaction amount), the token management server 500 may transmit the transaction amount to the loyalty program server 600 (e.g. together with the offer identifier), and the rewards processor 616 may determine the quantum of the loyalty points rewards from the transaction amount and from the applicable rewards rate of the located loyalty points offer (e.g. by (i) determining the rewards rate that is applicable to the transaction amount, and (ii) multiplying the transaction amount by the applicable rewards rate).

In another variation, the offer parameter(s) may identify a combination of a fixed loyalty points reward and a (variable) rewards rate, and the rewards processor 616 may determine the quantum of the loyalty points rewards from the transaction amount and from the applicable fixed loyalty points reward and/or rewards rate.

As discussed, each offer identifier excludes particulars of the secondary ledger to which the loyalty points reward (if any) may be applied. Therefore, the rewards processor 616 may be configured to apply the loyalty points reward to the secondary ledger that is associated with the offer identifier by (i) locating in the rewards database 613 the secondary ledger identifier that is associated with the offer identifier (received back from the token management server 500), and (ii) applying the loyalty points reward to the secondary ledger (in the secondary ledger database 612) that is associated with the secondary ledger identifier.

After applying the loyalty points reward to the secondary ledger, the rewards processor 616 may also notify the authorization server 400 that the loyalty points reward has been applied to the secondary ledger by generating a loyalty rewards confirmation message that includes the secondary ledger identifier and the current balance of loyalty points rewards in the secondary ledger, and transmitting the loyalty rewards confirmation message to the authorization server 400.

Method of Processing EMV-Session Data

As discussed, the payment data processing network 100 implements a method of processing EMV-session data. A sample embodiment of the EMV-session data processing method will be discussed with reference to FIG. 7. As will be explained, in this embodiment the POS terminal 300 establishes an EMV-compliant communications session with the communications appliance 200, and receives ledger data and a cryptogram from the communications appliance 200 via the communications session.

The POS terminal 300 extracts a primary ledger identifier from the ledger data, and transmits to a computer server (e.g. the authorization server 400, via the acquirer server 350) an authorization request message that includes the primary ledger identifier, the cryptogram and an authorization value.

The POS terminal 300 receives from the computer server an authorization response message in response to the authorization request message. The authorization response message confirms that the communications appliance 200 generated the cryptogram from at least the authorization value.

If the ledger data includes a loyalty token, the POS terminal 300 extracts the loyalty token from the ledger data, and transmits to a computer server (e.g. the token management server 500) a loyalty rewards request message that includes the loyalty token. Optionally, the POS terminal 300 may receive from a computer server (e.g. the authorization server 400, via the acquirer server 350) a rewards response message in response to the loyalty rewards request message. The rewards response message may advise of the loyalty points reward(s) applied to a secondary ledger that is associated with the loyalty token.

Figure 7:
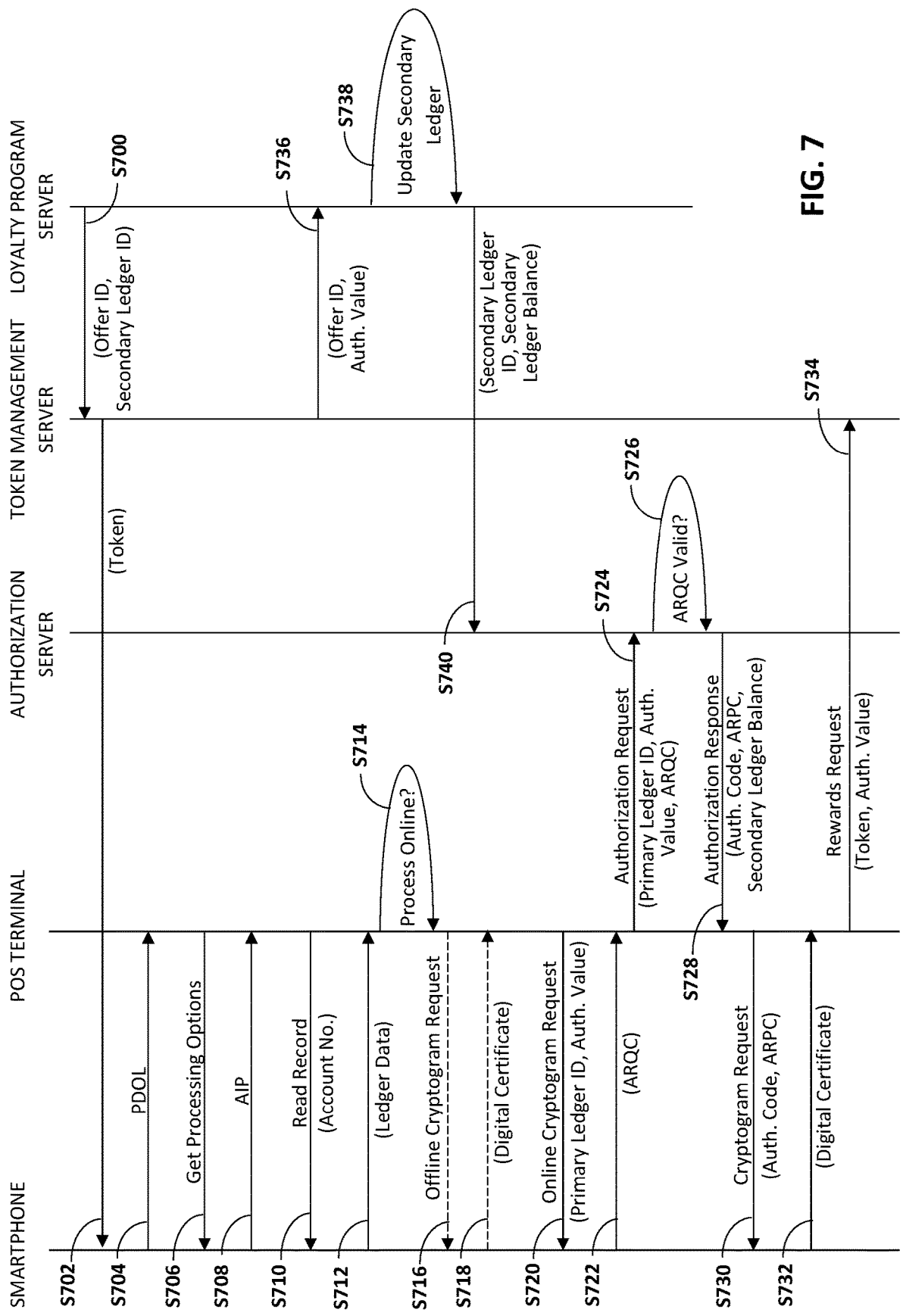
FIG. 7 is a message flow diagram depicting the method of processing EMV-session data.

An example EMV-session data processing method will now be discussed in detail with reference to FIG. 7. In the following example, a customer is in possession of a communications appliance 200 that stores, in the memory 214 thereof, a unique appliance identifier, ledger data (a primary ledger identifier, and a loyalty token), a reference PIN, a master cryptographic key, an appliance private cryptographic key, and an appliance public certificate that includes the appliance public cryptographic key corresponding to the appliance private cryptographic key.

In this example, the communications appliance 200 is configured as a smartphone. Further, in addition to the functionality described above, the EMV command processor 220 may implement an algorithm that generates an unpredictable transaction counter number that changes with each Generate Application Cryptogram command received by the communications appliance 200.

The authorization server 400 stores, in the memory 410 thereof, the master cryptographic key assigned to the communications appliance 200. The primary ledger database 412 stores a primary ledger in association with the primary ledger identifier of the primary ledger, and the secondary ledger identifier of a secondary ledger. The primary ledger stores the primary ledger's deposit/withdrawal entries, and a balance of loyalty points rewards in the secondary ledger.

The secondary ledger database 612 stores the secondary ledger in association with the secondary ledger identifier of the secondary ledger. The secondary ledger stores the secondary ledger's loyalty point reward/redeem entries, and the current balance of loyalty points rewards in the secondary ledger.

The rewards database 613 stores an offer identifier in association with a secondary ledger identifier, and the offer parameter(s) of an available loyalty points offer.

At the outset of the method, the loyalty programs administrator associates a secondary ledger with the customer by providing to the customer the secondary ledger identifier that is associated with the secondary ledger. The customer may then register their communications appliance 200 with the EMV-session data network 120 by providing the token management server 500 with the customer's secondary ledger identifier and the appliance identifier of the customer's communications appliance 200.

Subsequently, the loyalty program server 600 notifies the token management server 500 of any new pending loyalty points offers. Therefore, at step S700 the loyalty program server 600 retrieves from the rewards database 613 an offer identifier that is associated with a new pending loyalty points offer, and transmits the offer identifier to the management server 500. In this example, the loyalty points offer is restricted for use (redemption) with a specific secondary ledger. Therefore, at step S700 the loyalty program server 600 transmits the new offer identifier to the token management server 500, together with the secondary ledger identifier that is associated with that specific secondary ledger.

In response, at step S702 the token processor 516 may generate a unique loyalty token, save the loyalty token in the offer database 512 in association with the offer identifier, and transmit the loyalty token to the communications appliance 200 that is associated with the specified secondary ledger identifier. Preferably, the loyalty token includes a sequence of digits that is prefixed with the IIN of the Issuer.

In this example, the token processor 516 (i) locates the appliance identifier of the communications appliance 200 by querying the appliance database 513 with the received secondary ledger identifier, and (ii) may use a push notification service to download the loyalty token to the communications appliance 200 that has the located appliance identifier.

Alternately, the communications appliance 200 may be pre-configured with the loyalty token, and the appliance database 513 may store the loyalty token in association with the secondary ledger identifier (e.g. the Issuer may provide the token management server 500 with the loyalty token and the secondary ledger identifier when the Issuer installs the EMV command processor 220 in the memory 214 of the communications appliance 200). In this variation, at step S702 the token processor 516 (i) locates the loyalty token that is associated with the communications appliance 200 (e.g. by querying the appliance database 513 with the received secondary ledger identifier), and (ii) saves the loyalty token in the offer database 512 in association with the offer identifier.

After the management server 500 associates the offer identifier with the loyalty token (and provides the communications appliance 200 with the loyalty token, if required), the customer may attend at the premises of a merchant to complete a credit payment transaction the merchant. The merchant inputs the authorization value into the POS terminal 300. The POS terminal 300 may receive the authorization value directly via the input device 302 or indirectly via an ECR that is interfaced with the POS terminal 300.

The payment terminal 300 displays the authorization value on the display device 304, and prompts the customer to approve the displayed authorization value via the input device 302. The customer approves the displayed authorization value, and the POS terminal 300 prompts the customer to interface a payment card with the POS terminal 300. In response, the customer interfaces the communications appliance 200 with the LAN interface 306 token interface 206b.

At step S704, the EMV command processor 220 of the communications appliance 200 initiates an EMV-compliant communications session with the POS terminal 300 by providing the POS terminal 300 with a Processing Options Data List (PDOL) that identifies the data elements that the communications appliance 200 will require to authorize the financial transaction. Typically the PDOL lists at least the authorization value as one of the required data elements. At step S706, the EMV data processor 320 of the POS terminal 300 transmits to the communications appliance 200 a Get Processing Options command that includes the data specified in the PDOL.

At step S708, the EMV command processor 220 provides the POS terminal 300 with an Application Interchange Profile (AIP) that identifies the capabilities of the communications appliance 200, such as the type of offline data authentication (discussed below) that the communications appliance 200 supports. At step S710, the EMV data processor 320 transmits to the communications appliance 200 a Read Record command that identifies various data elements that the POS terminal 300 requires to facilitate authorization of the payment transaction.

Typically, the customer initiates the payment transaction by interfacing a payment card with the POS terminal 300. Therefore, the Read Record command requests at least an account number from the communications appliance 200. The Read Record command may also request the appliance public certificate of the communications appliance 200.

The EMV command processor 220 responds to the POS terminal 300, at step S712, with the ledger data and any other data requested by the Read Record command. The ledger data includes the primary ledger identifier and may also include a loyalty token.

The EMV command processor 220 may transmit the primary ledger identifier (and also the loyalty token, if stored on the communications appliance 200) to the POS terminal 300, as distinct data elements. However, in another implementation, the EMV command processor 220 generates a cypher from the ledger data (e.g. by applying the primary ledger identifier, the loyalty token and the appliance private cryptographic key as inputs to the asymmetric cryptographic key algorithm), and transmits the cypher to the POS terminal 300 at step S712, together with any other data requested by the Read Record command. Alternately, as discussed, the communications appliance 200 may generate the cypher in advance of receiving the Generate Application Cryptogram command, or may be pre-configured with the cypher when the loyalty token is stored in the communications appliance 200. In this alternate implementation, the EMV data processor 320 may recover the primary ledger identifier and the loyalty token from the cypher by applying the cypher and the appliance public cryptographic key as inputs to the asymmetric cryptographic key algorithm.

The POS terminal 300 may then validate the communications appliance 200 based on the type of offline data authentication, if any, identified in the AIP (received at step S708).

For example, If the AIP indicates that the communications appliance 200 supports Dynamic Data Authentication (DDA) or Combined Data Authentication (CDA), the EMV data processor 320 may generate an unpredictable number, include the unpredictable number in an offline cryptogram request, and transmit the offline cryptogram request to the communications appliance 200. In response, the EMV command processor 220 may generate an offline cryptogram from the unpredictable number and the appliance private cryptographic key, and provide the POS terminal 300 with the offline cryptogram. The EMV data processor 320 may then validate the communications appliance 200 by using the appliance public certificate to verify that the communications appliance 200 generated the offline cryptogram.

The POS terminal 300 may also authenticate the bearer of the communications appliance 200 by prompting the customer to input a PIN into the POS terminal 300 via the input device 302. After the customer inputs the PIN into the POS terminal 300, the EMV data processor 320 may transmit to the communications appliance 200 a Verify command that includes the PIN. The EMV command processor 220 may use the reference PIN to validate the PIN received from the POS terminal 300, and respond to the POS terminal 300 with a pass/fail validation message, indicating whether validation of the PIN received from the POS terminal 300 passed or failed.

Based on at least the results of the payment card validation and the cardholder authentication, at step S714 the EMV data processor 320 determines whether the payment transaction should be declined offline or approved online, or can be approved offline.

if the EMV data processor 320 determines, at step S714, that the payment transaction should be declined offline, the POS terminal 300 provides a notification, on the display device 304, advising the customer that the financial transaction was declined. The EMV data processor 320 then terminates the EMV-session data processing method.

However, if the EMV data processor 320 determines, at step S714, that the payment transaction can be approved offline, at step S716 the EMV data processor 320 generates an unpredictable number, includes the unpredictable number in an offline cryptogram request, and transmits the offline cryptogram request to the communications appliance 200. The EMV command processor 220 then determines whether the transaction can be approved offline. The EMV command processor 220 may make this determination by, for example, verifying that the number of consecutive transactions previously approved offline has not exceeded a predetermined limit.

If the EMV command processor 220 confirms that the payment transaction can be approved offline, the EMV command processor 220 generates an offline cryptogram from at least the primary ledger identifier, authorization value and unpredictable number, and incorporates the offline cryptogram into a digital certificate. The communications appliance 200 responds to the POS terminal 300 with the digital certificate, at step S718.

The EMV command processor 220 may generate the offline cryptogram, for example, by (i) generating a session key by applying the master cryptographic key and the transaction counter as inputs to a key generation algorithm, and (ii) applying the primary ledger identifier, the authorization value, the unpredictable number and the session key as inputs to a symmetric cryptographic key algorithm.

The EMV data processor 320 may use the appliance public certificate to confirm that the communications appliance 200 generated the offline cryptogram from the authorization value. The POS terminal 300 may then provide a notification, on the display device 304, advising the customer that the financial transaction was authorized (offline).

If the EMV data processor 320 determines, at step S714, that the payment transaction should be approved online, at step S720 the EMV data processor 320 generates an unpredictable number, and incorporates the authorization value and the unpredictable number into a Generate Application Cryptogram command that requests an online cryptogram from the communications appliance 200. The EMV data processor 320 then transmits the Generate Application Cryptogram command to the communications appliance 200.

Upon receipt of the online cryptogram request (or if the EMV data processor 320 requested an offline cryptogram at step S716, but the communications appliance 200 determined that the payment transaction could not be approved offline), the EMV command processor 220 generates an Application Request Cryptogram (ARQC) from at least the appliance private cryptographic key, primary ledger identifier, authorization value and unpredictable number. The communications appliance 200 responds to the POS terminal 300 with the ARQC, at step S722.

The EMV command processor 220 may generate the ARQC, for example, by (i) generating a session key by applying the master cryptographic key and the transaction counter as an input to a key generation algorithm, and (ii) generating an encrypted message authentication code by applying the primary ledger identifier, the authorization value and the session key as inputs to a symmetric cryptographic key algorithm At step S724, the EMV data processor 320 (i) generates an Authorization Request Message that includes the primary ledger identifier, authorization value, unpredictable number, transaction counter and ARQC, and (ii) forwards the Authorization Request Message to the acquirer server 350 via the acquirer network 140. The acquirer server 350 directs the Authorization Request Message to the authorization server 400, over the payment network 150, for validation.

At step S726, the authorization processor 416 of the authorization server 400 verifies that the communications appliance 200 generated the ARQC from at least the authorization value. To do so, the authorization processor 416 may (i) recover the session key by applying the primary ledger identifier, the transaction counter and the master cryptographic key as inputs to a key recovery algorithm, (ii) decrypt the ARQC by applying the ARQC and the session key as inputs to the symmetric cryptographic key algorithm, (iii) compute a message authentication code from the primary ledger identifier, the authorization value, and the unpredictable number, and (iv) compare the computed message authentication code against the decrypted cryptogram.

As noted above, the EMV command processor 220 may generate the session key by applying the master cryptographic key and the transaction counter as inputs to a key generation algorithm. Therefore, in this example, the key generation algorithm may be identical to the key recovery algorithm implemented by the authorization processor 416, but modified to implement the unique case where the primary ledger identifier is a predefined input.

At step S726, the authorization processor 416 may also determine whether the primary ledger that is associated with the primary ledger identifier is still active and has sufficient credit/funds to complete the payment transaction (i.e. the authorization value is less than the credit/funds balance for the primary ledger).

If the payment transaction is authorized (i.e. the authorization processor 416 determined that (i) the communications appliance 200 generated the ARQC from the authorization value, and (ii) the primary ledger that is associated with the primary ledger identifier is still active and has sufficient credit/funds to complete the payment transaction), the authorization server 400 updates the primary ledger to reflect the reduction in credit/funds available in the primary ledger.

At step S728, the authorization processor 416 generates an authorization code that indicates whether the Issuer authorized the payment transaction. The authorization processor 416 also generates an Application Response Cryptogram (ARPC) from at least the authorization code and the ARQC. The authorization processor 416 may generate the ARPC, for example, by generating an encrypted message authentication code by applying the primary ledger identifier, authorization code, ARQC, and session key as inputs to a symmetric cryptographic key algorithm.

At step S728, the authorization processor 416 also (i) generates an Authorization Response Message that includes the primary ledger identifier, authorization code and ARPC, and (ii) forwards the Authorization Response Message to the acquirer server 350 over the payment network 150. The acquirer server 350 directs the Authorization Response Message to the POS terminal 300, via the acquirer network 140.

However, as noted above, after applying a loyalty points reward to a secondary ledger, the loyalty program server 600 may transmit to the authorization server 400 a rewards confirmation message that includes the current balance of loyalty points rewards in the secondary ledger. The authorization server 400 may then save the loyalty points reward balance in the primary ledger that is associated with the primary ledger identifier. Therefore, in one variation, at step S728 the authorization processor 416 (i) locates the loyalty points reward balance that is associated with the primary ledger identifier in the primary ledger database 412, and (ii) incorporates the loyalty points reward balance into the Authorization Response Message (in addition to the primary ledger identifier, authorization code and ARPC). In this variation, the authorization processor 416 may also generate the encrypted message authentication code of the ARPC by applying the primary ledger identifier, authorization code, ARQC, session key and loyalty points reward balance as inputs to the symmetric cryptographic key algorithm.

Independently of whether the authorization code indicates that the Issuer authorized or declined the payment transaction, at step S730 the EMV data processor 320 generates an unpredictable number, and incorporates the authorization code, unpredictable number and ARPC into a Generate Application Cryptogram command that requests confirmation that the Issuer generated the ARPC from the authorization code. The EMV data processor 320 then transmits the Generate Application Cryptogram command to the communications appliance 200.

The EMV command processor 220 then determines whether the Issuer generated the ARPC from the authorization code. To do so, the EMV command processor 220 may (i) decrypt the cryptogram ARPC with the session key, (ii) compute a message authentication code from the primary ledger identifier, authorization code and ARQC (and loyalty points reward balance, if used to generate the ARPC), and (iii) compare the computed message authentication code against the decrypted cryptogram.

If the communications appliance 200 confirms that the Issuer generated the cryptogram ARPC from at least the authorization code, the EMV command processor 220 generates a cryptogram from at least the primary ledger identifier, the authorization value and the unpredictable number, and incorporates the cryptogram into a digital certificate. The communications appliance 200 responds to the POS terminal 300 with the digital certificate, at step S732. The EMV command processor 220 may generate the cryptogram, for example, by (i) generating a session key by applying the master cryptographic key and the transaction counter as inputs to a key generation algorithm, (ii) applying the primary ledger identifier, the authorization value, the unpredictable number and the session key as inputs to a symmetric cryptographic key algorithm, and (iii) signing the resulting cryptogram with the appliance private cryptographic key.

The EMV data processor 320 may use the appliance public certificate to confirm that the communications appliance 200 signed the cryptogram. The POS terminal 300 may then provide a notification, on the display device 304, advising the customer that the payment transaction was authorized (or declined). Further, if the Authorization Response Message includes the loyalty points reward balance, the POS terminal 300 may also provide a notification, on the display device 304, advising of the loyalty points reward balance.

The EMV data processor 320 terminates the EMV-session data processing method if the authorization code indicates that the payment transaction was declined. However, if the EMV data processor 320 receives confirmation from the communications appliance 200 that the payment transaction was authorized (whether offline, at step S718; or online, at step S732), the EMV data processor 320 determines whether the ledger data (received from the communications appliance 200 in response to the Read Record command) includes a loyalty token.

As discussed above, the loyalty token (if included in the ledger data) may include a sequence of digits that is prefixed with the Issuer's IIN, and the POS terminal 300 may include a local database of IIN's that are associated with the Issuer. Therefore, the EMV data processor 320 may determine whether the ledger data includes a loyalty token by comparing the ledger data against the IIN's that are stored in the local database.

If EMV data processor 320 determines that the ledger data includes a loyalty token, at step S734 the EMV data processor 320 extracts the loyalty token from the ledger data, and transmits to the token management server 500 a loyalty rewards request message that includes the loyalty token. Further, as discussed, the loyalty program server 600 may use the authorization value to determine the quantum of the loyalty points reward. Therefore, the EMV data processor 320 may also include the authorization value in the loyalty rewards request message.

The token management server 500 responds to the loyalty rewards request message by initiating a loyalty points reward to the secondary ledger that is associated with the loyalty token. Therefore, at step S736, the token processor 516 extracts the loyalty token from the loyalty rewards request message, generates an offer identifier from the loyalty token, and transmits the offer identifier to the loyalty program server 600. If the loyalty rewards request message includes an authorization value, the token processor 516 also transmits the authorization value to the loyalty program server 600, together with the offer identifier.

In this example, the token processor 516 generates the offer identifier by locating the offer identifier that is associated with the loyalty token in the offer database 512 (e.g. by querying the offer database 512 with the loyalty token). If the token processor 516 locates the loyalty token in the offer database 512 (i.e. the loyalty token received from the POS terminal 300 is valid), the token processor 516 may expire the loyalty token by deleting the association between the loyalty token and the offer identifier in the offer database 512. Optionally, the token processor 516 may also delete the association (if any) between the loyalty token and secondary ledger identifier, in the appliance database 513.

After the loyalty program server 600 receives the offer identifier (and optionally the authorization value), at step S738 the rewards processor 616 determines the quantum (if any) of the loyalty points reward that may be available for the payment transaction, and applies the loyalty points reward to the secondary ledger that is associated with the offer identifier.

In this example, the rewards processor 616 determines the quantum of the loyalty points reward by (i) locating the secondary ledger identifier and offer parameter(s) that are associated with the offer identifier in the rewards database 613 (e.g. by querying the rewards database 613 with the offer identifier received from the token management server 500), and (ii) evaluating the located offer parameter(s). The located offer parameter(s) may identify a reward that varies with the transaction amount. Therefore, the rewards processor 616 may determines the quantum of the loyalty points reward by evaluating the located offer parameter(s) against the transaction amount.

The rewards processor 616 then applies the loyalty points reward (if any) to the secondary ledger that is associated with the secondary ledger identifier in the secondary ledger database 612, and updates the current balance of loyalty points rewards in the secondary ledger to reflect the applied loyalty points reward. Optionally, the rewards processor 616 may also expire the loyalty points offer by deleting the offer identifier and the associated secondary ledger identifier and offer parameter(s) in the rewards database 613.

Optionally, at step S740, the rewards processor 616 generates a loyalty rewards confirmation message that includes the secondary ledger identifier and the current balance of loyalty points rewards in the secondary ledger, and transmits the loyalty rewards confirmation message to the authorization server 400. In response, the authorization processor 416 updates the primary ledger database 412 with the current loyalty points reward balance. The authorization processor 416 may update the primary ledger database 412 by (i) extracting the secondary ledger identifier and the loyalty points reward balance from the rewards confirmation message, (ii) locating the primary ledger that is associated with the secondary ledger identifier in the primary ledger database 412, and (iii) saving the loyalty points reward balance in the located primary ledger.

Subsequently (e.g. at step S724), the authorization processor 416 may receive, from the POS terminal 300, another Authorization Request Message that includes the primary ledger identifier that is associated with the secondary ledger identifier in the primary ledger database 412. The authorization processor 416 may then read from the primary ledger database 412 the loyalty points reward balance that is associated with the primary ledger identifier, and incorporate the loyalty points reward balance into the next Authorization Response Message that is returned to the POS terminal 300.

In the foregoing example, the POS terminal 300 transmits the loyalty rewards request message to the token management server 500 (at step S734) if the EMV data processor 320 receives confirmation that the payment transaction was authorized (whether offline, at step S718; or online, at step S732). Further, the rewards processor 616 applies the loyalty points reward to the secondary ledger (at step S738) substantially immediately after determining the quantum of the loyalty points reward. However, in another example, the POS terminal 300 transmits the loyalty rewards request message to the token management server 500 (at step S734) without waiting for confirmation that the payment transaction was authorized, and the rewards processor 616 does not apply the loyalty points reward to the secondary ledger substantially immediately after determining the quantum of the loyalty points reward.

Instead, in this alternate example, after the rewards processor 616 determines the quantum of the loyalty points reward at step S738, the rewards processor 616 generates a loyalty rewards authorization request message that includes the secondary ledger identifier (and optionally also includes the authorization value and/or a time frame value) and transmits the loyalty rewards authorization request message to the authorization server 400.

In response, the authorization processor 416 determines whether a payment transaction involving the associated primary ledger was authorized, generates a loyalty rewards authorization response message that includes the secondary ledger identifier and indicates whether such a payment transaction was authorized, and transmits the loyalty rewards authorization response message to the loyalty program server 600.

The authorization processor 416 may determine whether such a payment transaction was authorized by, for example, (i) extracting the secondary ledger identifier and the authorization value from the loyalty rewards authorization request message, (ii) locating the primary ledger that is associated with the secondary ledger identifier in the primary ledger database 412, and (iii) comparing the extracted authorization value against the authorization value of the most recent update to the primary ledger. The authorization processor 416 may also extract the time frame value from the loyalty rewards authorization request message, and confirm that the primary ledger includes a ledger update (for a payment transaction in an amount equal to the extracted authorization value) within the specified time frame.

If the loyalty rewards authorization response message confirms that the payment transaction was authorized, the rewards processor 616 applies the loyalty points reward to the secondary ledger associated with the secondary ledger identifier, and updates the current balance of loyalty points rewards in the secondary ledger to reflect the applied loyalty points reward. Optionally, the rewards processor 616 then generates a loyalty rewards confirmation message that includes the secondary ledger identifier and the current balance of loyalty points rewards in the secondary ledger, and transmits the loyalty rewards confirmation message to the authorization server 400, as discussed above with reference to step S740.

In contrast to the first example, this alternate example increases the processing load on the loyalty program server 600 since the rewards processor 616 waits for confirmation from the authorization server 400 before applying the loyalty points reward to the secondary ledger. However, this alternate example reduces the processing load on the EMV data processor 320, and may also reduce the time required to complete the method, since the POS terminal 300 need not wait for receipt of the Authorization Response Message before transmitting the loyalty rewards request message but can transmit the Authorization Request Message and the loyalty rewards request message at substantially the same time without any additional decision logic.

The invention claimed is:

1. An EMV-session data network comprising:
   a point-of-sale terminal; and
   at least one computer server,
   wherein the point-of-sale terminal is configured to:
      (a) establish an EMV-compliant communications session with a communications appliance, and receive ledger data and a cryptogram from the communications appliance via the communications session; and
      (b) extract a primary ledger identifier from the ledger data, and transmit an authorization request message to the at least one computer server, the authorization request message including the primary ledger identifier, the cryptogram and an authorization value;
   wherein the at least one computer server is configured to:
      (i) receive the authorization request message;
      (ii) generate an authorization response message confirming that the communications appliance generated the cryptogram from the primary ledger identifier and the authorization value; and
      (iii) transmit the authorization response message to the point-of-sale terminal;
   wherein the point-of-sale terminal is further configured to:
      (c) receive the authorization response message;
      (d) extract a loyalty token from the ledger data; and
      (e) transmit a loyalty rewards request message to the at least one computer server, the loyalty rewards request message including the loyalty token; and
   wherein the at least one computer server is further configured to:
      (iv) receive the loyalty rewards request message; and
      (v) initiate a loyalty points reward to a secondary ledger associated with the loyalty token.

2. The data processing network according to claim 1, wherein, the point-of-sale terminal is configured to transmit to the communications appliance, via the communications session, a read command requesting an account number from the communications appliance, and to receive the ledger data from the communications appliance in response to the read command.

3. The data processing network according to claim 1, wherein:
   the communications appliance stores a cryptographic key uniquely associated with the communications appliance;
   the point-of-sale terminal is configured to transmit to the communications appliance, via the communications session, a generate cryptogram command including the authorization value, and receive the cryptogram from the communications appliance in response to the generate cryptogram command; and
   the at least one computer server is configured to confirm that the cryptogram was generated from the primary ledger identifier, the authorization value and the cryptographic key.

4. The data processing network according to claim 2, wherein the communications appliance is configured to generate a cypher from the primary ledger identifier and the loyalty token, and the point-of-sale terminal is configured to receive the cypher from the communications appliance in response to the read command and to recover the primary ledger identifier and the loyalty token from the cypher.

5. The data processing network according to claim 1, wherein the at least one computer server is configured to initiate the loyalty points reward to the secondary ledger by generating an offer identifier from the loyalty token, and transmitting the offer identifier to a loyalty program server, the offer identifier excluding particulars of the secondary ledger.

6. The data processing network according to claim 5, wherein the at least one computer server includes an offer database comprising a plurality of loyalty points offers, one of the loyalty points offers stores the offer identifier in association with the loyalty token, and the at least one computer server is configured to generate the offer identifier by locating the offer identifier associated with the loyalty token in the offer database.

7. The data processing network according to claim 5, wherein the at least one computer server is configured to receive the offer identifier from the loyalty program server, generate the loyalty token, store the loyalty token in the offer database in association with the offer identifier, and transmit the loyalty token to the communications appliance prior to initiating the loyalty points reward to the secondary ledger.

8. The data processing network according to claim 5, wherein the loyalty program server includes a rewards database comprising a plurality of records, one of the records stores the offer identifier in association with at least one parameter of the loyalty points reward, the loyalty program server is configured to generate a rewards value from the offer identifier and to apply the rewards value to the secondary ledger, and the loyalty program server is configured to generate the rewards value by locating the at least one parameter associated with the offer identifier in the rewards database, and determining the rewards value from the located at least one parameter.

9. A method of processing EMV-session data, the method comprising a point-of-sale terminal:
establishing an EMV-compliant communications session with a communications appliance, and receiving ledger data and a cryptogram from the communications appliance via the communications session;
extracting a primary ledger identifier from the ledger data, and transmitting an authorization request message to at least one computer server, the authorization request message including the primary ledger identifier, the cryptogram and an authorization value;
receiving from the at least one computer server an authorization response message in response to the authorization request message, the authorization response message confirming that the communications appliance generated the cryptogram from the primary ledger identifier and the authorization value;
extracting a loyalty token from the ledger data;
transmitting a loyalty rewards request message to the at least one computer server, the loyalty rewards request message including the loyalty token; and
receiving from the at least one computer server a rewards response message in response to the loyalty rewards request message, the rewards response message advising of a loyalty points reward to a secondary ledger associated with the loyalty token.

10. The method according to claim 9, wherein the receiving ledger data comprises the point-of-sale terminal transmitting to the communications appliance, via the communications session, a read command requesting an account number from the communications appliance, and receiving the ledger data from the communications appliance in response to the read command.

11. The method according to claim 9, wherein the communications appliance stores a cryptographic key uniquely associated with the communications appliance;
the receiving a cryptogram comprises the point-of-sale terminal transmitting to the communications appliance, via the communications session, a generate cryptogram command including the authorization value, and receiving the cryptogram from the communications appliance in response to the generate cryptogram command; and
the confirming that the communications appliance generated the cryptogram comprises the at least one computer server confirming that the cryptogram was generated from the primary ledger identifier, the authorization value and the cryptographic key.

12. The method according to claim 10, wherein:
the receiving ledger data comprises the communications appliance generating a cypher from the primary ledger identifier and the loyalty token, and the point-of-sale terminal receiving the cypher from the communications appliance in response to the read command; and
the transmitting an authorization request message comprises the point-of-sale terminal recovering the primary ledger identifier and the loyalty token from the cypher.

13. The method according to claim 9, wherein receiving a rewards response message comprises the at least one computer server initiating the loyalty points reward to the secondary ledger by (i) generating an offer identifier from the loyalty token, and (ii) transmitting the offer identifier to a loyalty program server, the offer identifier excluding particulars of the secondary ledger.

14. The method according to claim 13, wherein the at least one computer server is in communication with an offer database comprising a plurality of loyalty points offers, one of the loyalty points offers stores the offer identifier in association with the loyalty token, and the generating an offer identifier comprises the at least one computer server locating the offer identifier associated with the loyalty token in the offer database.

15. The method according to claim 13, further comprising, prior to the generating an offer identifier and prior to initiating the loyalty points reward to the secondary ledger, the at least one computer server receiving the offer identifier from the loyalty program server, generating the loyalty token, storing the loyalty token in the offer database in association with the offer identifier, and transmitting the loyalty token to the communications appliance.

16. The method according to claim 13, further comprising the loyalty program server generating a rewards value from the offer identifier, and applying the rewards value to the secondary ledger, wherein the loyalty program server is in communication with a rewards database comprising a plurality of records, one of the records stores the offer identifier in association with at least one parameter of the loyalty points reward, and the generating a rewards value comprises the loyalty program server locating the at least one parameter associated with the offer identifier in the rewards database, and determining the rewards value from the located at least one parameter.

17. A pin-pad device comprising:
a data input device;
a communications interface;
a data processor in communication with the data input device and the communications interface, wherein the data processor is configured to:

establish an EMV-compliant communications session with a communications appliance, and receive ledger data and a cryptogram from the communications appliance via the communications session and the communications interface;

extract a primary ledger identifier from the ledger data, and transmit an authorization request message to at least one computer server, the authorization request message including the primary ledger identifier, the cryptogram and an authorization value;

receive from the at least one computer server an authorization response message in response to the authorization request message, the authorization response message confirming that the communications appliance generated the cryptogram from the primary ledger identifier and the authorization value;

extract a loyalty token from the ledger data;

transmit a loyalty rewards request message to the at least one computer server, the loyalty rewards request message including the loyalty token; and receive from the at least one computer server a rewards response message in response to the loyalty rewards request message, the rewards response message advising of a loyalty points reward to a secondary ledger associated with the loyalty token.

18. The pin-pad device according to claim 17, wherein the data processor is configured to:

transmit to the communications appliance, via the communications session and the communications interface, a read command requesting an account number from the communications appliance; and receive the ledger data from the communications appliance in response to the read command.

19. The pin-pad device according to claim 18, wherein the data processor is configured to:

transmit to the communications appliance, via the communications session and the communications interface, a generate cryptogram command including the authorization value, and receive the cryptogram from the communications appliance in response to the generate cryptogram command.

20. The pin-pad device according to claim 17, wherein the ledger data includes a cypher, and the data processor is configured to:

receive the cypher from the communications appliance, via the communications session and the communications interface, in response to the read command; and recover the primary ledger identifier and the loyalty token from the cypher.

* * * * *